(12) United States Patent
Kono

(10) Patent No.: US 7,702,316 B2
(45) Date of Patent: Apr. 20, 2010

(54) PORTABLE TERMINAL

(75) Inventor: Kenji Kono, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 1152 days.

(21) Appl. No.: 11/318,080

(22) Filed: Dec. 23, 2005

(65) Prior Publication Data

US 2006/0154666 A1 Jul. 13, 2006

(30) Foreign Application Priority Data

Dec. 27, 2004 (JP) ............... P.2004-378270

(51) Int. Cl.
*H04L 12/58* (2006.01)

(52) U.S. Cl. ............. 455/412.1; 455/566; 455/158.4; 455/418; 455/403; 379/218.01; 379/207.15

(58) Field of Classification Search ............. 455/412.1, 455/566, 158.4, 419, 418, 403, 426, 420, 455/466; 379/218.01, 207.15, 201.04
See application file for complete search history.

(56) References Cited

U.S. PATENT DOCUMENTS

| | | | | |
|---|---|---|---|---|
| 4,486,624 A * | 12/1984 | Puhl et al. ............... | 370/278 |
| 5,563,939 A * | 10/1996 | La Porta et al. ......... | 379/221.02 |
| 5,572,204 A * | 11/1996 | Timm et al. ............ | 340/988 |
| 5,586,338 A * | 12/1996 | Lynch et al. ............ | 455/433 |
| 5,686,910 A * | 11/1997 | Timm et al. ............ | 340/988 |
| 6,246,875 B1 * | 6/2001 | Seazholtz et al. ...... | 455/432.1 |
| 6,295,291 B1 * | 9/2001 | Larkins ................. | 370/352 |
| 6,349,212 B1 * | 2/2002 | Martensson et al. ..... | 455/462 |
| 6,408,177 B1 * | 6/2002 | Parikh et al. ........... | 455/414.4 |
| 6,408,191 B1 * | 6/2002 | Blanchard et al. ...... | 455/566 |
| 6,671,508 B1 * | 12/2003 | Mitsuoka et al. ....... | 455/412.1 |
| 6,694,156 B2 * | 2/2004 | Seo ...................... | 455/574 |
| 6,775,359 B1 * | 8/2004 | Ron et al. .............. | 379/88.14 |
| 6,970,692 B2 * | 11/2005 | Tysor ................... | 455/405 |
| 6,973,299 B2 * | 12/2005 | Apfel .................... | 455/412.2 |
| 7,197,120 B2 * | 3/2007 | Luehrig et al. ......... | 379/88.14 |
| 7,283,841 B2 * | 10/2007 | Luke et al. ............. | 455/556.1 |
| 7,359,498 B2 * | 4/2008 | Faber et al. ............ | 379/210.01 |
| 2002/0151293 A1 * | 10/2002 | Tysor ................... | 455/406 |
| 2003/0199282 A1 * | 10/2003 | Marcjan et al. ......... | 455/466 |
| 2004/0092267 A1 * | 5/2004 | Naeini et al. ........... | 455/445 |
| 2004/0203648 A1 * | 10/2004 | Wong .................... | 455/414.1 |
| 2005/0204030 A1 * | 9/2005 | Koch et al. ............. | 709/223 |
| 2005/0288006 A1 * | 12/2005 | Apfel .................... | 455/418 |

FOREIGN PATENT DOCUMENTS

| | | |
|---|---|---|
| JP | 09-130425 | 5/1997 |
| JP | 2003-078648 | 3/2003 |
| JP | 2003-078649 | 3/2003 |

\* cited by examiner

*Primary Examiner*—Minh D Dao
(74) *Attorney, Agent, or Firm*—Hogan & Hartson LLP

(57) ABSTRACT

When a communication regulation determining block determines that E-mail communication is regulated when an E-mail processing block prepares for communication or initiates communication, information indicative of alternative communicating section using another communication path in which communication is not regulated is displayed on a user interface section. Therefore, it is possible to easily check which communicating section is effective when communication regulation occurs, and hence the user can easily make a determination such as that alternative communicating section is used, or that communication is aborted.

23 Claims, 18 Drawing Sheets

"TRANSMIT LATER" OR "STORE WITHOUT TRANSMISSION"
IS SELECTED.
(E-MAIL PRODUCTION SCREEN)

"TRANSMIT SMS MAIL" IS SELECTED.
(SMS PRODUCTION SCREEN)

"MAKE CALL" IS SELECTED.
(ADDRESS BOOK SCREEN)

"STOP PRODUCTION OF MAIL" IS SELECTED.
(IDLE SCREEN)

FIG. 14
E-MAIL PRODUCTION BUTTON IS DEPRESSED BY USER
ALL ARE REGULATED
DATA COMMUNICATION AND VOICE ARE REGULATED
ONLY DATA COMMUNICATION IS REGULATED
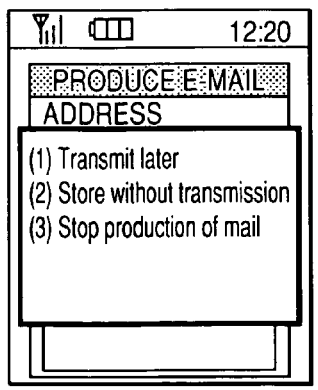 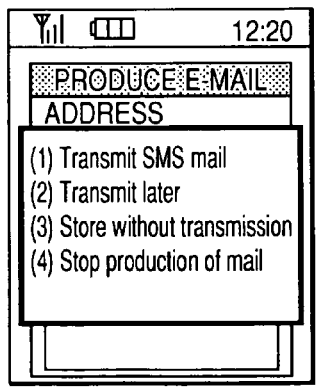 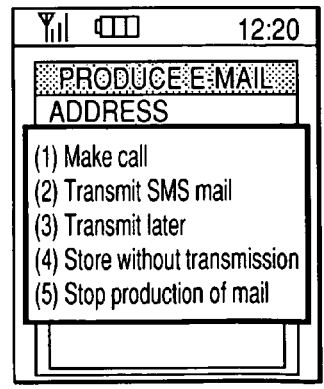

"TRANSMIT LATER", "STORE WITHOUT TRANSMISSION", OR "STOP PRODUCTION OF MAIL" IS SELECTED.

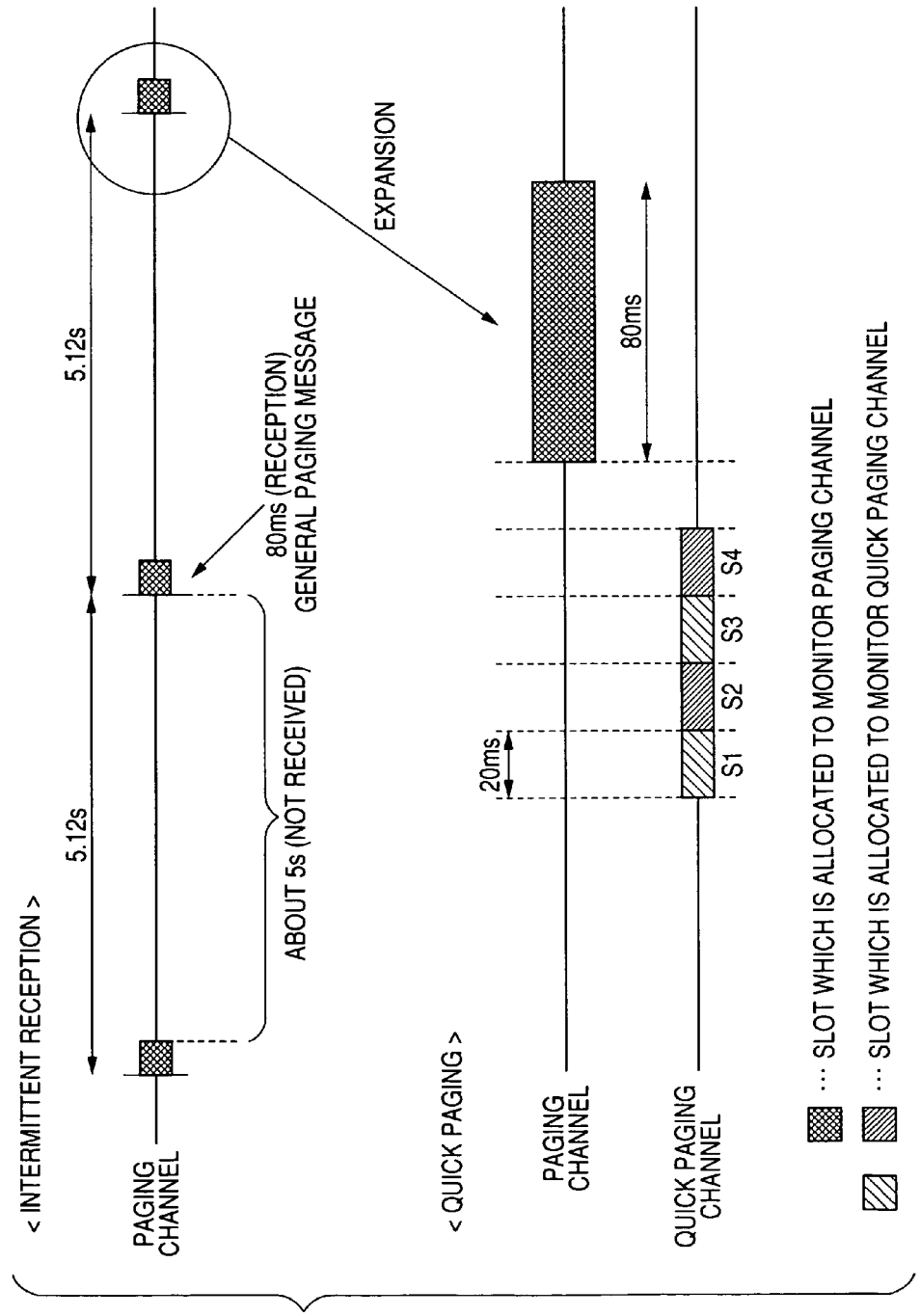

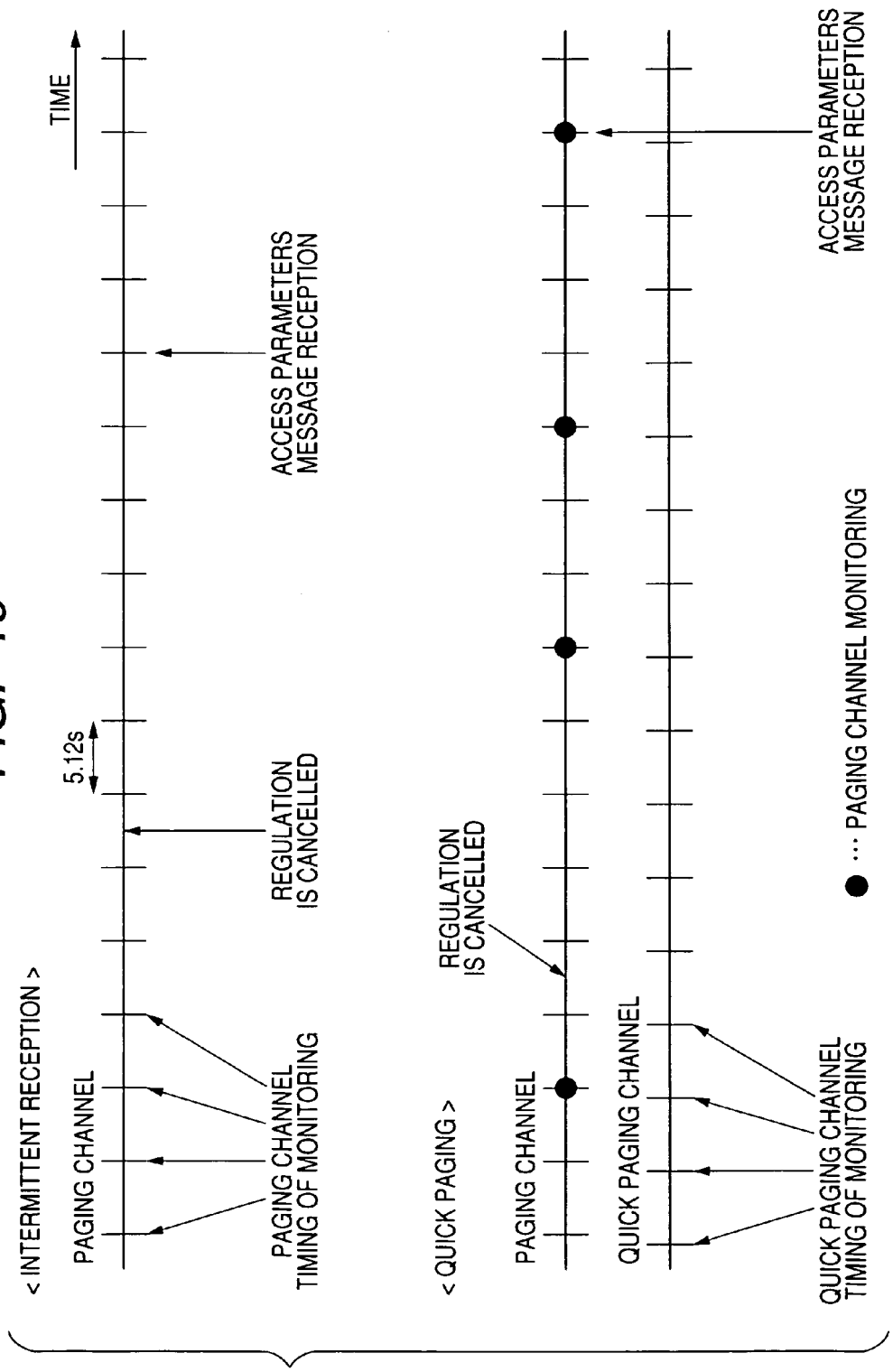

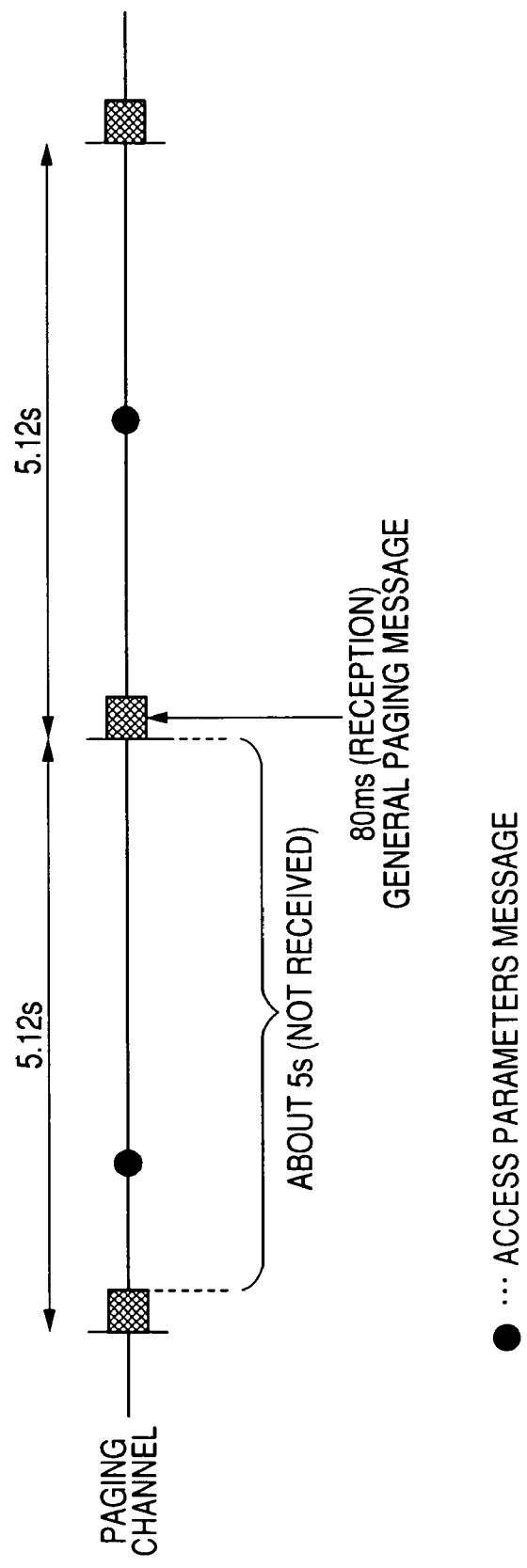

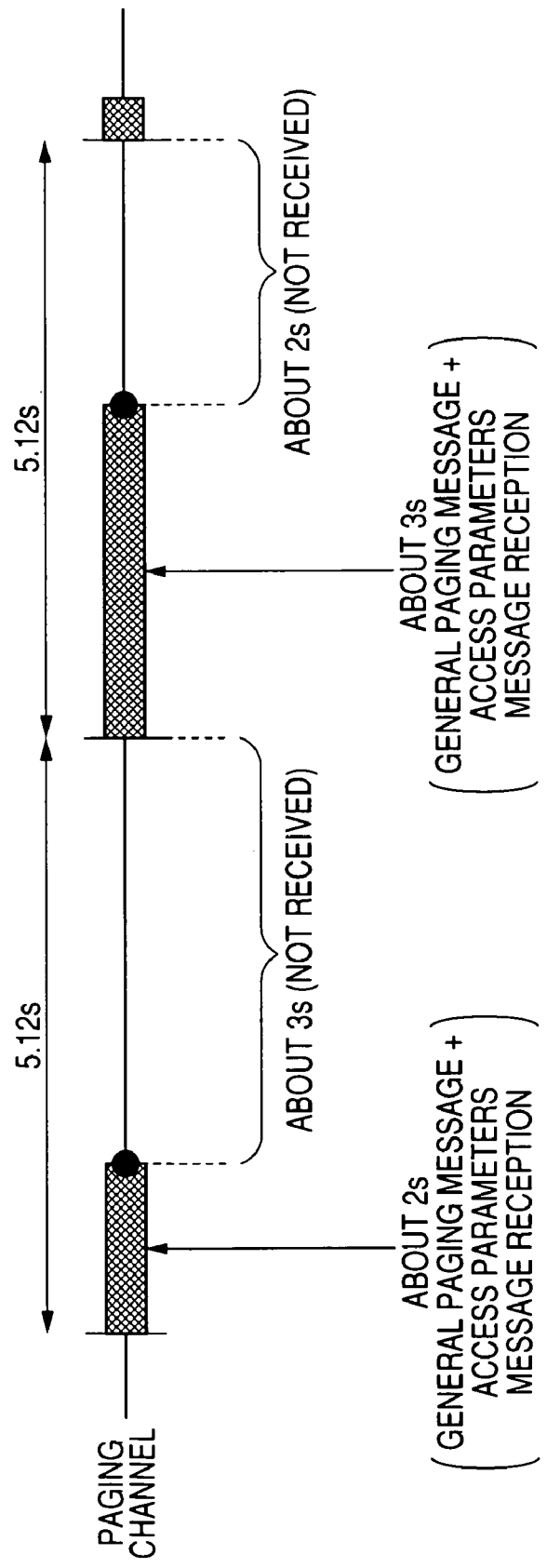

PORTABLE TERMINAL

CROSS-REFERENCE TO RELATED APPLICATIONS

This application is based upon and claims the benefit of priority from the prior Japanese Patent Applications No. 2004-378270, filed on Dec. 27, 2004, the entire contents of which are incorporated herein by reference.

BACKGROUND OF THE INVENTION

1. Field of the Invention

The present invention relates to a portable terminal such as a portable telephone, and more particularly to a portable terminal having a plurality of communicating sections corresponding to voice communication, an E-mail, etc.

2. Description of the Related Art

A technique for switching over communication systems or communicating section depending on the kind of the partner terminal, the situations of communication, or the like is known.

For example, JP-A-9-130425 discloses an E-mail transmitting and receiving system having: a device which converts voice to characters; a device which converts characters to voice; and a device which converts kana/kanji characters to kana characters. In the system, an E-mail is converted while selecting one of the devices which is suited to the kinds of terminals transmitting and receiving the E-mail, and then transferred, thereby realizing the use of an E-mail in various kinds of terminals.

JP-A-2003-78648 and JP-A-2003-78649 disclose communication apparatuses in which, when an E-mail is to be transmitted, the reception state of the partner communication apparatus is checked in advance of the transmission, and the method of transmitting the E-mail is changed in accordance with a result of the check.

A communication system is known in which, when the partner terminal rejects character communication (chat), or when communication is disabled because of reasons such as that the partner terminal is positioned outside the communication range, character communication is switched to mail communication performed through the identical communication path.

Another communication apparatus is known in which, when communication is disabled because of reasons such as that the partner terminal is positioned outside the communication range, an E-mail for an incoming call notification is transmitted to the partner terminal.

A further communication system is known which has a function of, when a terminal in which voice communication is inhibited, for example, in the case of driving a vehicle, informing the partner terminal that communication with an E-mail can be received.

JP-A-9-130425, JP-A-2003-78648, and JP-A-2003-78649 are referred to as related art.

Usually, recent portable telephones have various communication functions in addition to voice communication. A typical communication function is a function of communication of E-mails via the Internet. Many of the other communication functions are compatible with E-mail distribution services such as that called SMS (short message service). The SMS is a service in which simple messages can be exchanged between portable telephones with using a communication sequence for voice communication. In the service, the communication fee is set to be low. Therefore, the service gets many users.

In the SMS, when an E-mail according to the SMS (hereinafter, referred to as SMS mail) is to be transmitted between portable telephones subscribing to the same carrier, the SMS mail is transmitted with designating the destination telephone number. When an SMS mail to be transmitted to another portable telephone is produced, therefore, the user is not required to input a special address for an SMS mail. When an SMS mail received from another portable telephone is opened, the telephone number of the portable telephone is displayed as a mail address of the transmission source.

On the other hand, when a large number of communications are concentrated at a time in a portable telephone base station, for example, a congested state occurs. In the case where such a state occurs, the base station may temporarily regulate communication between portable telephones. In the communication regulation, it is often that all communications are regulated irrespective of the kinds such as voice communication, an E-mail, an SMS mail, or that only voice communication is regulated in view of nuisance to the surround.

In a communication standard called "cdma2000" and the like, communication regulation can be performed on each of the kinds. Contrary to the above, therefore, a case may possibly occur where voice communication is possible but E-mail communication is regulated.

In a portable terminal having the plurality of the communicating sections (voice communication, an E-mail, an SMS mail, and the like), when a situation where respective communication paths can be independently regulated occurs, the user oneself must manually check which the communicating section is effective when communication regulation occurs, and make a determination such as that alternative communicating section is used, or that communication is stopped. Consequently, there arises a problem in that operations of the check and determination take a lot of trouble. In all of the related art described above, no measure for enabling the user to check which the communicating section is effective when communication regulation occurs is taken, and hence the problem cannot be solved.

In the communication system where character communication is switched to mail communication performed through the identical communication path, when communication regulation occurs in the communication path, the user must manually check whether or not the communication can be switched to voice communication or E-mail communication which uses another communication path. Consequently, there arises a problem in that operations require a lot of trouble.

SUMMARY OF THE INVENTION

An object of the invention is to provide a portable terminal in which it is possible to easily check adequate alternative communicating section even when communication regulation occurs.

The invention provides a portable terminal having a plurality of communicating sections which use different communication paths, having: a communication regulation determining section which determines whether communication is regulated in the communication path used by one of the communicating section or not; and a communication regulation processing section which displays information of another communicating section using another communication path on a user interface section, in a case where the communication regulation determining section determines that communication is regulated in the communication path used by the communicating section when the communicating section prepares for communication or initiates communication.

The invention also provides a portable terminal having a plurality of communicating sections which use different communication paths, having: a communication regulation determining section which determines whether communication is regulated in the communication path used by one of the communicating section or not; and a communication regulation processing section which displays information of another communicating section using another communication path on a user interface section, enables to change the communicating section to another communicating section, in a case where the communication regulation determining section determines that communication is regulated in the communication path for a first data communication when one of the communicating section for performing the first data communication prepares for communication or initiates communication.

In the portable terminal, the plurality of communicating sections include two or more of a first data communicating section which performs the first data communication, a second data communicating section which performs second data communication with using a communication path which is different from the communication path for the first data communication, and a voice communicating section which performs voice communication.

In the portable terminal, the communication regulation processing section enables to select one of a first process of selecting communicating section which uses a communication path different from the communication path for the first data communication, a second process in which initiation of the first data communication is waited until the communication regulation determining section determines that communication is not regulated in the communication path for the first data communication, a third process in which transmission data of the first data communication is not transmitted but stored, and a fourth process in which the first data communication is aborted.

In the portable terminal, if the communication regulation determining section determines that communication is regulated in the communication paths of all of the communicating section, the communication regulation processing section enables to select one of the second process, the third process, and the fourth process in accordance with instructions which are input to the user interface section.

In the portable terminal, in a case where the communication regulation determining section determines that communication is regulated in the communication path for the first data communication when transmission data of the first data communication are produced and/or transmitted, the communication regulation processing section displays the information of another communicating section using another communication path on the user interface section.

In the portable terminal, the time when transmission data are produced is a time when instructions for initiating production of the transmission data are input to the user interface section, and the time when transmission data are transmitted is a time when instructions for initiating transmission of the transmission data are input to the user interface section.

In the portable terminal, the plurality of communicating sections include the first data communicating section which performs the first data communication, and second data communicating section which performs second data communication with using a communication path which is different from the communication path for the first data communication, and in a case where the communication regulation processing section selects the second data communicating section as the changed communicating section when the transmission data of the first data communication are produced, a predetermined data production screen which produces the transmission data of the second data communication is displayed on the user interface section.

In the portable terminal, in accordance with instructions input to the user interface section, the communication regulation processing section enables to select one of the first process of selecting communicating section which uses a communication path different from the communication path for the first data communication, the second process in which initiation of the first data communication is waited until the communication regulation determining section determines that communication is not regulated in the communication path for the first data communication, and the third process in which transmission data of the first data communication is not transmitted but stored, and in a case where the communication regulation processing section selects the second process or the third process when the transmission data of the first data communication are produced, the communicating section which performs the first data communication displays a predetermined data production screen for producing the transmission data of the first data communication on the user interface section.

In the portable terminal, the plurality of communicating sections include voice communicating section which performs voice communication, the portable terminal further has a storage section which stores a destination address of the first data communication and a telephone number of the voice communication while being correlated with each other, and in a case where the communication regulation processing section selects the voice communicating section as the changed communicating section when the transmission data of the first data communication are transmitted, the telephone number correlated with the destination address of the transmission data is retrieved from the storage section, and a call is made to the retrieved telephone number.

In the portable terminal, the plurality of communicating sections include a first data communicating section which performs the first data communication, and a second data communicating section which performs second data communication with using a communication path which is different from the communication path for the first data communication, the portable terminal further has a storage section which stores an address of the first data communication and an address of the second data communication while being correlated with each other, and in a case where the communication regulation processing section selects the second data communicating section as the changed communicating section when the transmission data of the first data communication are transmitted, the address of the second data communication correlated with the destination address of the transmission data is retrieved from the storage section, and the transmission data are transmitted to the retrieved address.

In the portable terminal, in a case where the communication regulation processing section selects the second data communicating section as the changed communicating section when the transmission data of the first data communication are transmitted, if a message that the attached file cannot be transmitted is displayed on the user interface section.

In the portable terminal, in a case where the communication regulation processing section selects the second data communicating section as the changed communicating section when the transmission data of the first data communication are transmitted, if a size of the transmission data exceeds a predetermined data size, a predetermined data correction screen for correcting the transmission data is displayed on the user interface section.

In the portable terminal, in a case where the communication regulation processing section selects the second data communicating section as the changed communicating section when the transmission data of the first data communication are transmitted, if there is an attached file in the transmission data, the attached file is transmitted by the first data communicating section after the communication regulation determining section determines that communication is not regulated in the communication path for the first data communication.

In the portable terminal, the communication regulation determining section determines whether the first data communication is regulated in an accessed base station or not when the communicating section which performs the first data communication prepares for communication or initiates communication; if it is determined that the first data communication is regulated in the base station, further determines whether the first data communication is regulated in other accessible base stations or not; if an accessible base station in which communication is not regulated is found, initiates the first data communication in the station in which communication is not regulated; and, if no accessible base station in which communication is not regulated is found, finally determines that the first data communication is regulated.

In the portable terminal, in the case where the communication regulation processing section implements the second process when the portable terminal is in an operation mode where reception is intermittently done at constant intervals, a communication channel through which a message informing whether the first data communication is regulated or not is transmitted is continuously monitored at the constant intervals until the message is received.

According to the portable terminal, even when communication regulation occurs in a communication path, alternative communicating section which uses another communication path can be adequately indicated to the user. Therefore, the operability can be remarkably improved as compared with a related-art portable terminal in which the user must manually check alternative communicating section.

BRIEF DESCRIPTION OF THE DRAWINGS

FIG. 14 is a view showing an example of a screen display of the user interface section when an E-mail is transmitted;

FIG. 18 is a diagram illustrating intermittent reception and quick paging;

FIG. 19 is a diagram illustrating a phenomenon in which, with respect to an actual timing when communication regulation is canceled, a timing of receiving a message notifying its information is delayed when intermittent reception or quick paging is performed;

FIG. 20 is a diagram illustrating related-art intermittent reception; and

FIG. 21 is a diagram illustrating intermittent reception in the portable terminal of the embodiment.

DETAILED DESCRIPTION OF THE PREFERRED EMBODIMENTS

An embodiment of the invention will be described with reference to the accompanying drawings.

Figure 1:
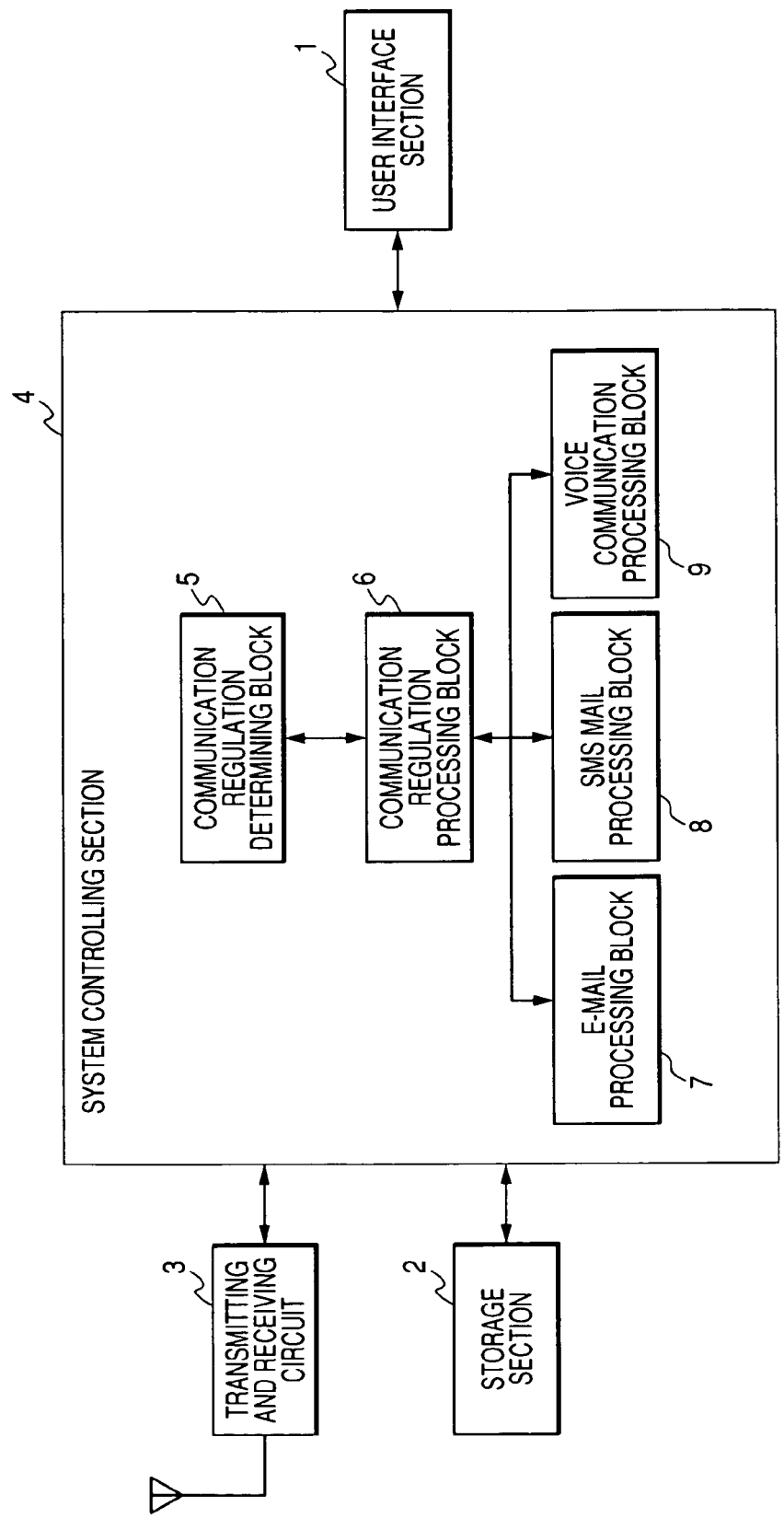
FIG. 1 is a diagram showing an example of the configuration of a portable terminal which is an embodiment of the invention.
Figure 2:
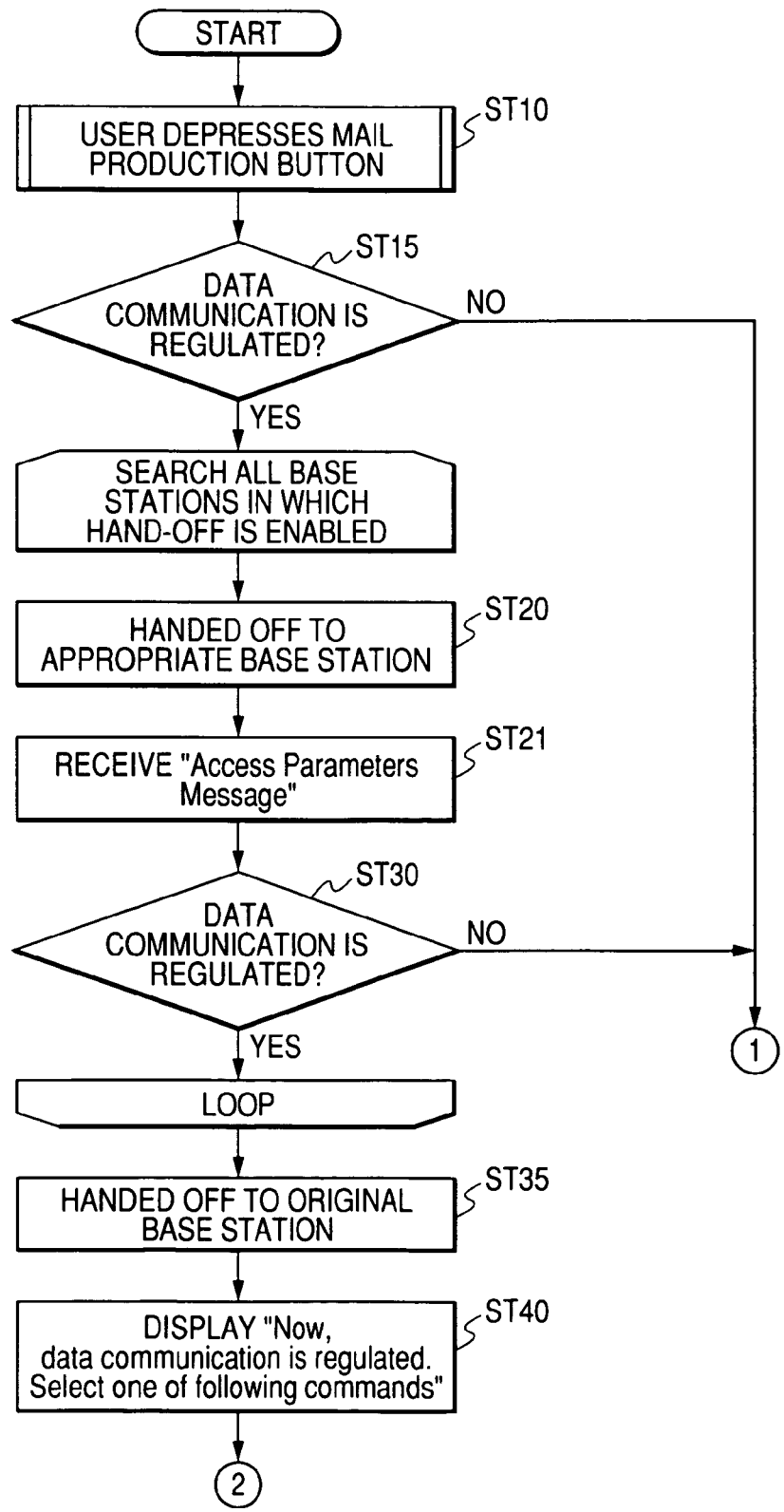
FIG. 2 is a first flowchart illustrating the operation of the portable terminal shown in FIG. 1.
Figure 3:
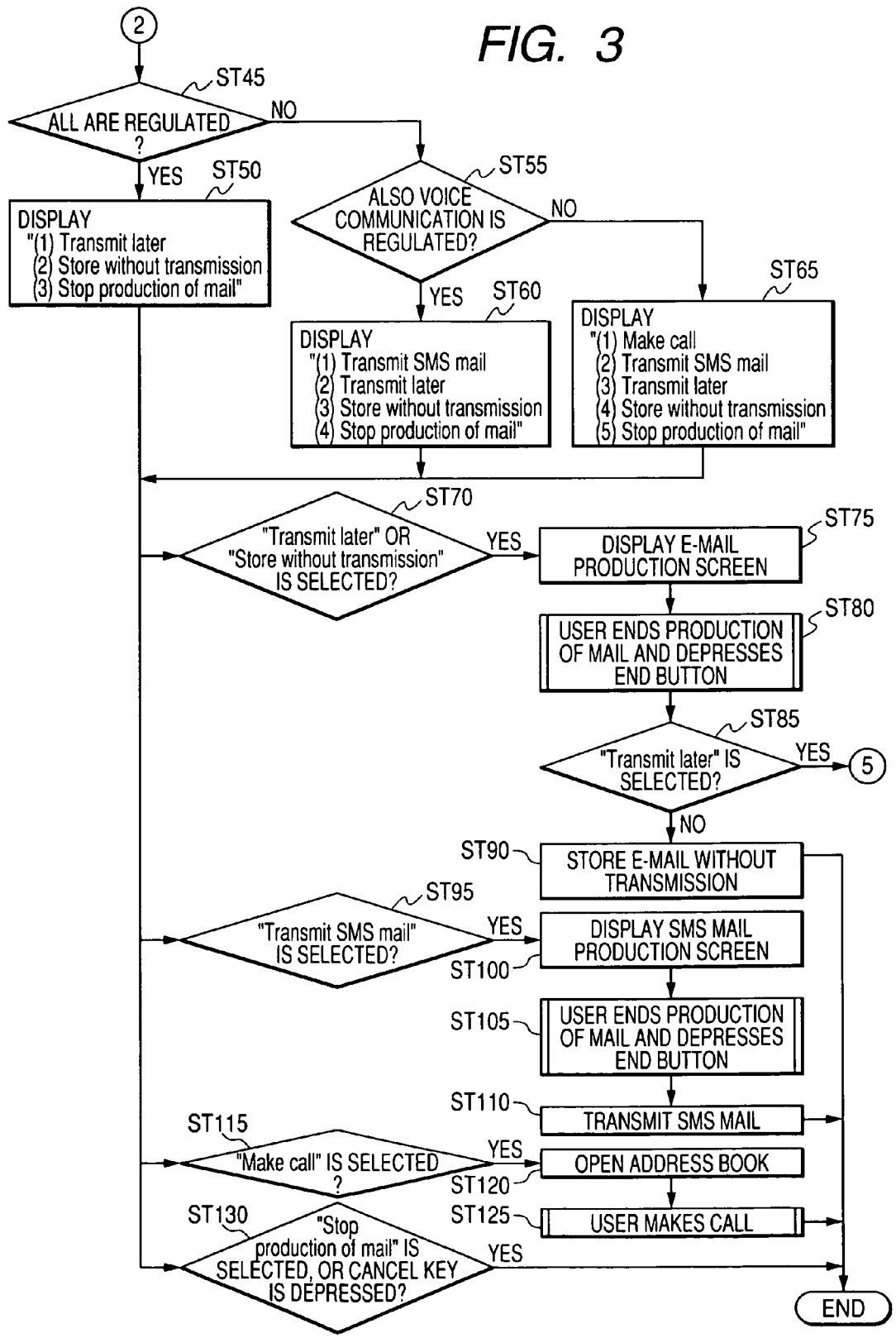
FIG. 3 is a second flowchart illustrating the operation of the portable terminal shown in FIG. 1.
Figure 4:
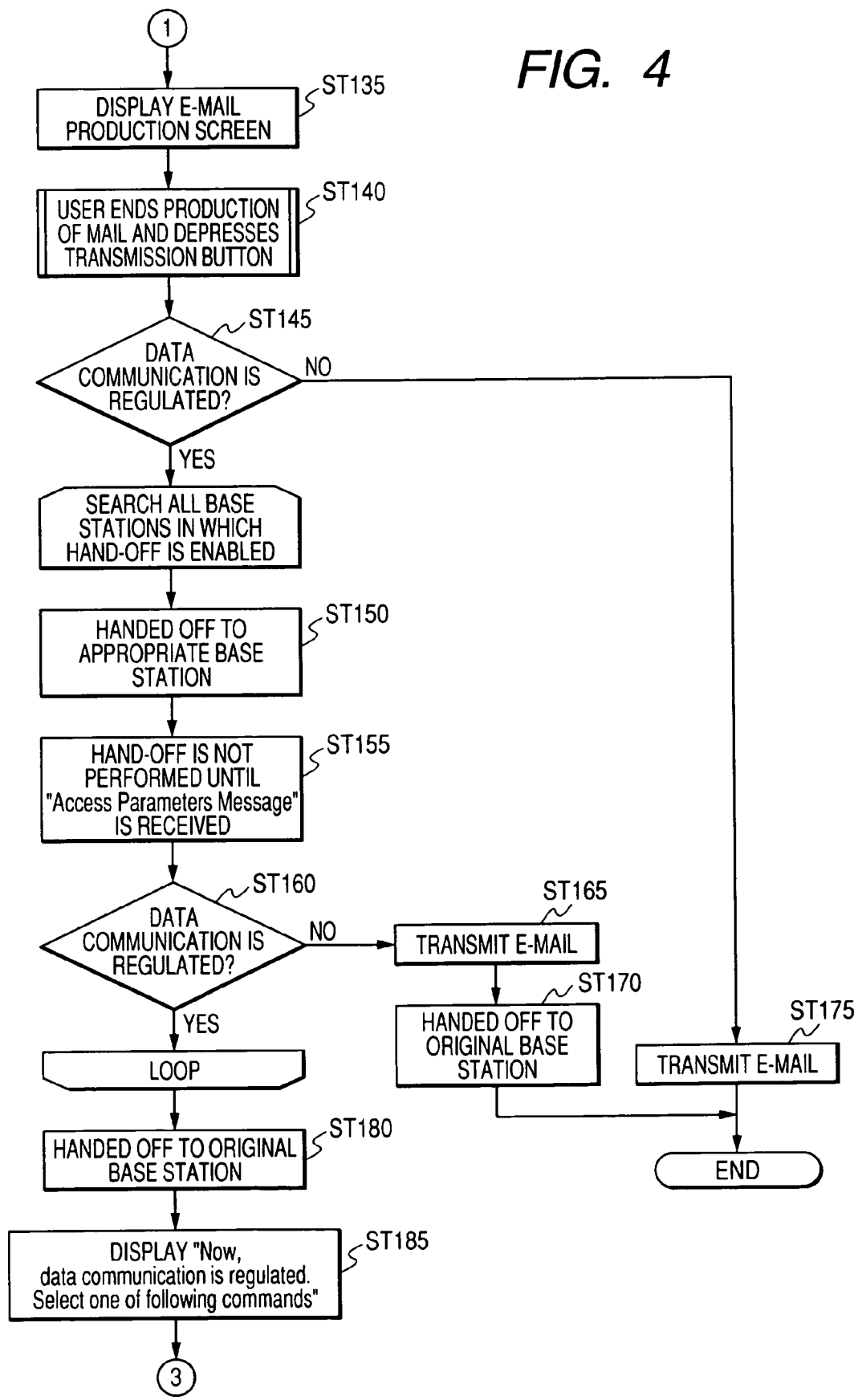
FIG. 4 is a third flowchart illustrating the operation of the portable terminal shown in FIG. 1.
Figure 5:
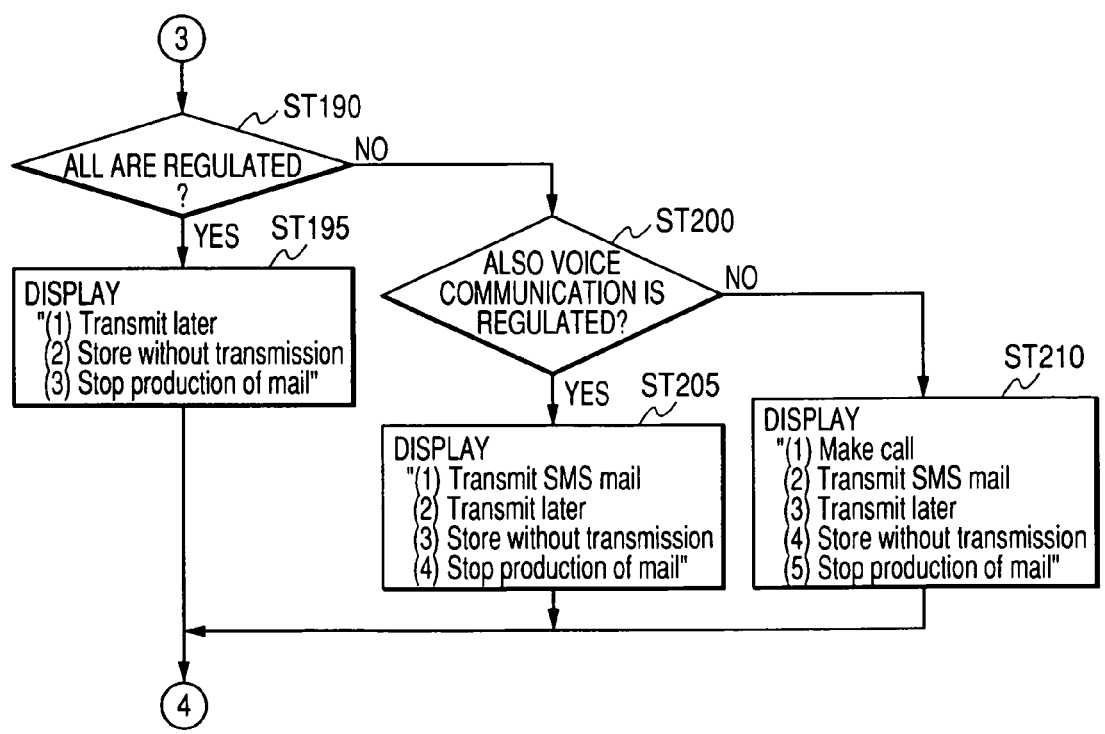
FIG. 5 is a fourth flowchart illustrating the operation of the portable terminal shown in FIG. 1.
Figure 6:
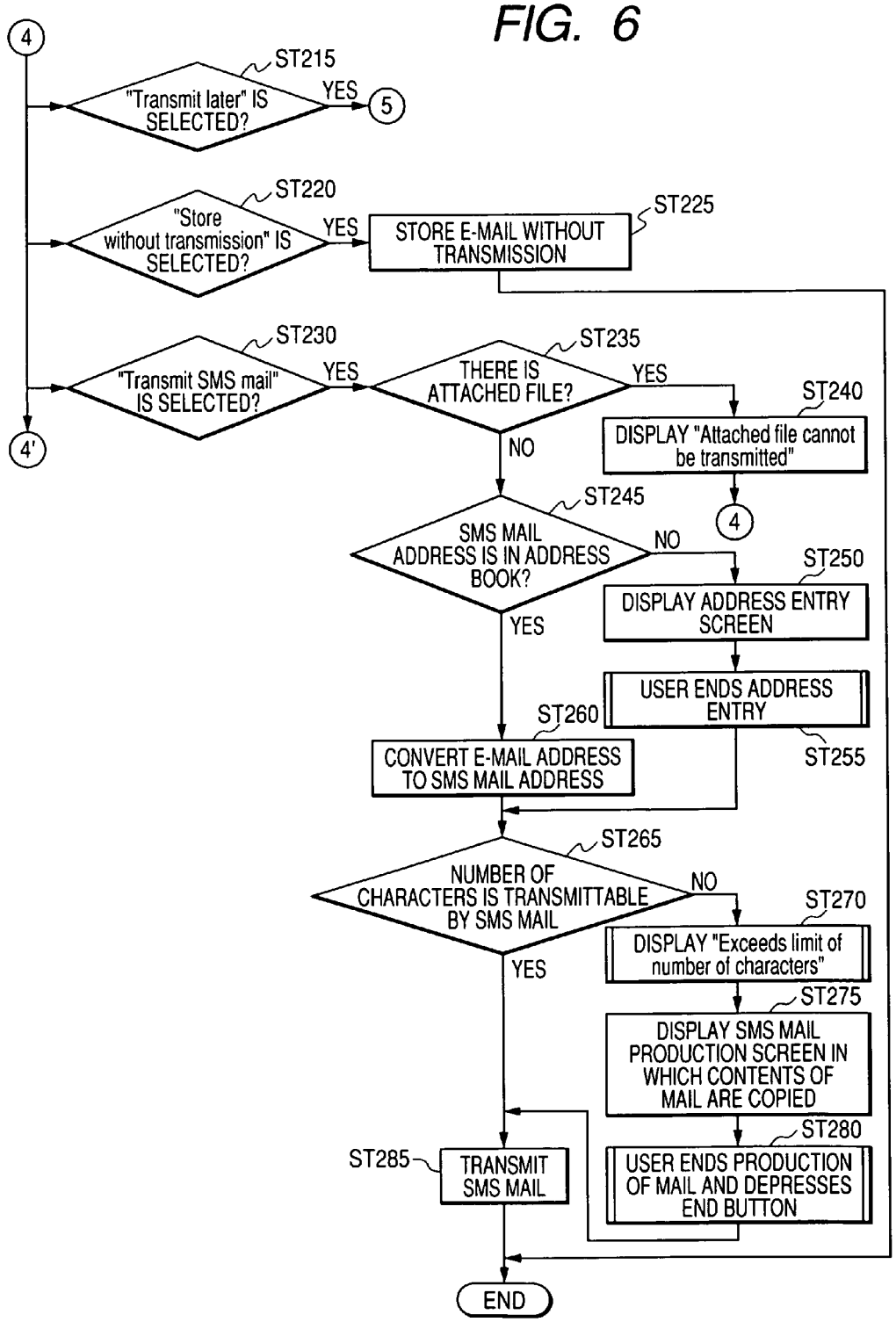
FIG. 6 is a fifth flowchart illustrating the operation of the portable terminal shown in FIG. 1.
Figure 7:
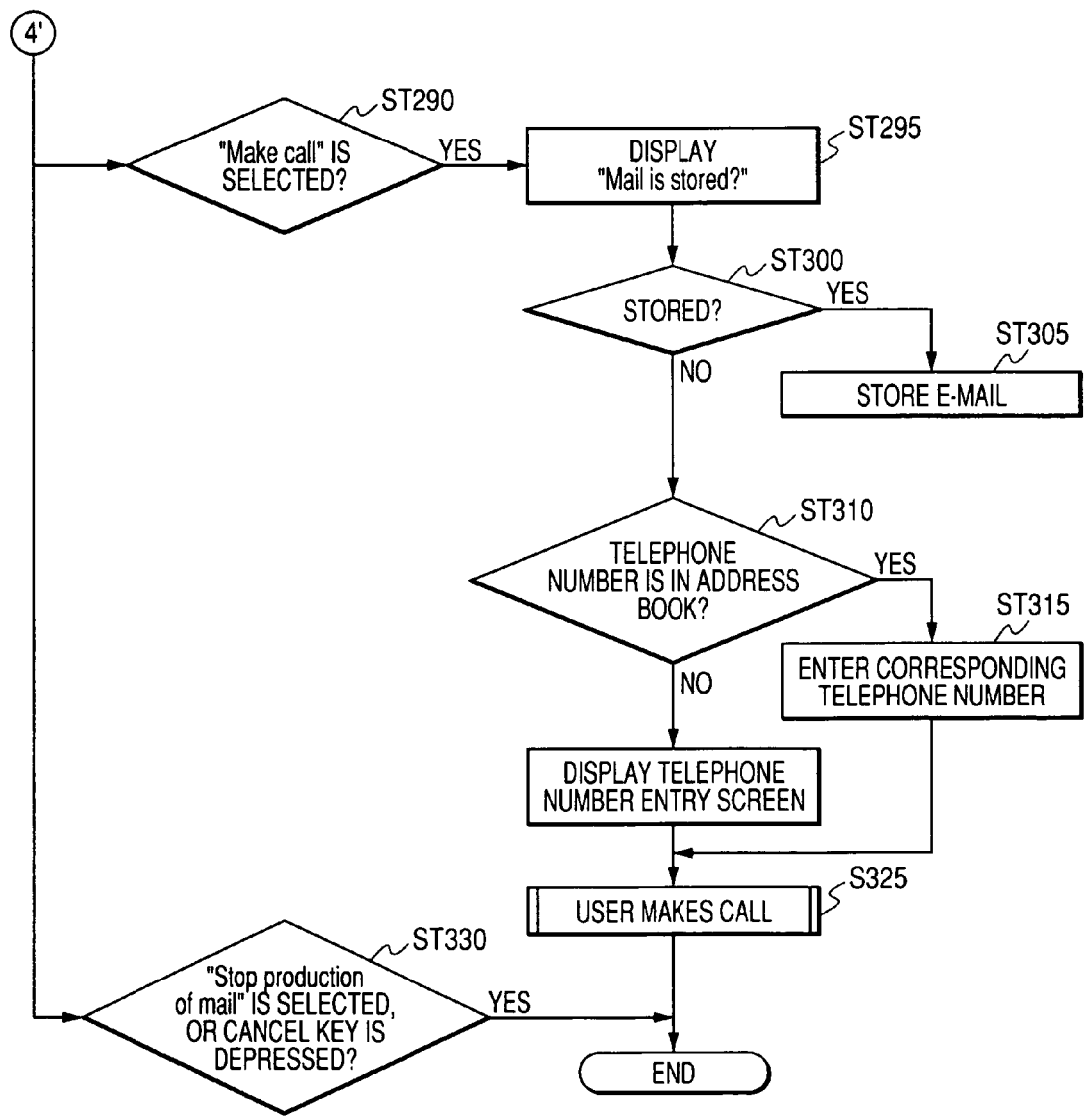
FIG. 7 is a sixth flowchart illustrating the operation of the portable terminal shown in FIG. 1.
Figure 8:
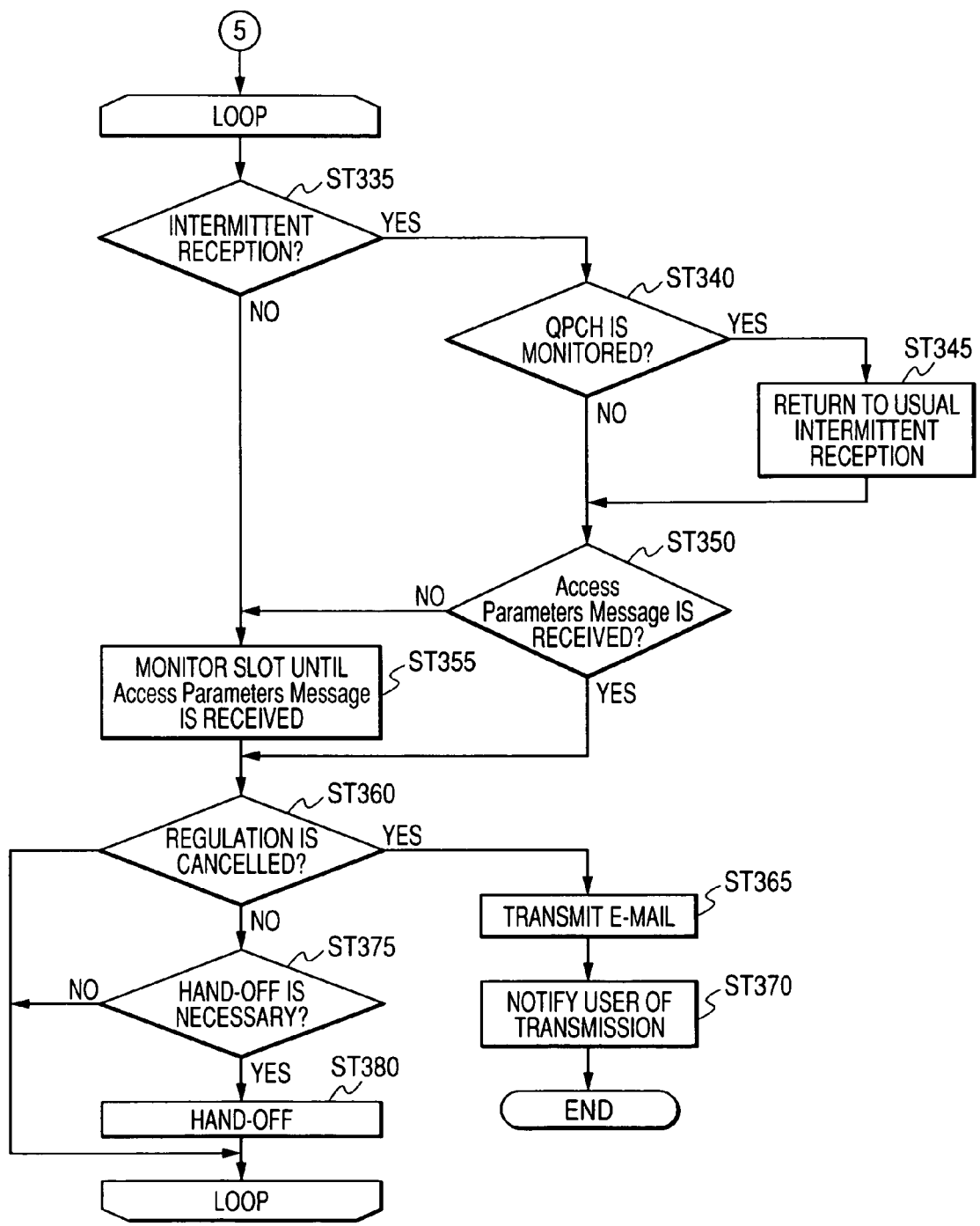
FIG. 8 is a seventh flowchart illustrating the operation of the portable terminal shown in FIG. 1.

FIG. 1 is a diagram showing an example of the configuration of a portable terminal which is an embodiment of the invention.

The portable terminal shown in FIG. 1 has a user interface section 1, a storage section 2, a transmitting and receiving circuit 3, and a system controlling section 4.

The system controlling section 4 has a communication regulation determining block 5, a communication regulation processing block 6, an E-mail processing block 7, an SMS mail processing block 8, and a voice communication processing block 9.

The user interface section 1 is used for inputting information from the user, and displaying information for the user, and, for example, has a displaying device which displays an image, and various operation keys for inputting information.

The storage section 2 stores various data which are used in the process of the system controlling section 4, such as an address book which manages telephone numbers, E-mail addresses, and like information for each person.

The transmitting and receiving circuit 3 is a circuit for performing radio communication with a base station which constitutes a communication network, and which is not shown. Under the control of the system controlling section 4, the circuit applies a predetermined modulation process on digital transmission data, converts the data into a high-frequency transmission signal, and transmits the signal from an antenna which is not shown. The circuit applies a predetermined demodulation process on a radio wave which is transmitted from the base station, and which is received by the antenna, converts it into digital reception data, and supplies the data to the system controlling section 4.

The transmitting and receiving circuit 3 may apply a common modulation/demodulation process on data which are to be processed in the three communication processing blocks (the E-mail processing block 7, the SMS mail processing block 8, and the voice communication processing block 9) which will be described later, or may apply respective independent modulation/demodulation processes on a part or the whole of the blocks. Namely, the transmitting and receiving circuit 3 may have one transmitting and receiving circuit which is shared by the three communication processing blocks, or have a plurality of transmitting and receiving circuits which are used independently by a part or the whole of the three communication processing blocks.

The system controlling section 4 performs various processes related to the operation of the whole portable terminal, or namely controls the transmitting and receiving circuit 3 in accordance with instructions supplied from the user interface section 1, and performs communication processes such as the voice communication, the E-mail, and the SMS mail. The system controlling section further performs a process of displaying various screens requesting inputs of instructions by the user and information, in the user interface section 1.

The process blocks included in the system controlling section 4 will be described.

[Communication Regulation Determining Block 5]

The communication regulation determining block 5 determines whether communication is regulated in each of the communication paths of the E-mail, the SMS mail, and the voice communication or not. In communication in accordance with "cdma2000", for example, the determination on communication regulation is made on the basis of regulation information contained in a message (hereinafter, abbreviated to APM) which is transmitted from the base station, and which is called "access parameters message".

When the E-mail processing block 7 prepares for communication or initiates communication, the communication regulation determining block 5 determines whether E-mail communication is regulated in the accessed base station or not. If it is determined that E-mail communication is regulated, the block further determines whether E-mail communication is regulated in other accessible base stations or not. If an accessible base station in which communication is not regulated is found, E-mail communication is initiated in the station in which communication is not regulated. If no accessible base station in which communication is not regulated is found, it is finally determined that E-mail communication is regulated.

In the case where the communication regulation processing block 6 performs a process of performing E-mail communication (a second process which will be described later) after communication regulation is cancelled, when the portable terminal is in an operation mode where reception is intermittently done at constant intervals, the communication regulation determining block 5 performs a process of continuously monitoring a predetermined communication channel through which the message (APM) informing whether E-mail communication is regulated or not is transmitted, at the constant intervals until the message is received.

[Communication Regulation Processing Block 6]

If, at the time when the E-mail processing block 7 prepares for communication or initiates communication, the communication regulation determining block 5 determines that E-mail communication is regulated, the communication regulation processing block 6 displays information indicative of alternative communicating section using another communication path in which communication is not regulated, in the user interface section 1. In accordance with instructions which are input to the user interface section 1 in response to the display, the communication regulation processing block selects new communicating section to be used in communication.

If the communication regulation determining block 5 determines that E-mail communication is regulated, the communication regulation processing block 6 performs, for example, a selected one of the following four processes (first to fourth processes) in accordance with instructions which are input to the user interface section 1.

(First Process)

In this process, new communicating section to be used in communication is selected. Specifically, SMS mail communication by the SMS mail processing block 8, or voice communication by the voice communication processing block 9 is selected. When voice communication is regulated, however, only SMS mail communication can be selected.

(Second Process)

Until the communication regulation determining block 5 determines that E-mail communication is not regulated, initiation of E-mail communication is postponed.

(Third Process)

A transmission mail in E-mail communication is not transmitted, but is stored into the storage section 2.

(Fourth Process)

E-mail communication is aborted.

If the communication regulation determining block 5 determines that all of E-mail communication, SMS mail communication, and voice communication are regulated, the communication regulation processing block 6 performs the second, third, or fourth process, and does not perform the first process.

When an E-mail is produced and/or transmitted, the communication regulation processing block 6 displays information of alternative communicating section in the user interface section 1.

Specifically, if, when an E-mail is produced and/or transmitted, the communication regulation determining block 5 determines that E-mail communication is regulated, the communication regulation processing block 6 displays information of alternative communicating section using another communication path in which communication is not regulated, in the user interface section 1.

The time when an E-mail is produced is a time when instructions for initiating production of an E-mail are input to the user interface section 1, such as a time when an E-mail production button disposed in the user interface section 1 is depressed.

The time when an E-mail is transmitted is a time when instructions for initiating transmission of an E-mail are input to the user interface section 1, such as a time when an E-mail transmission button disposed in the user interface section 1 is depressed.

[E-Mail Processing Block 7]

The E-mail processing block 7 performs various processes related to E-mail communication, such as production of an E-mail which is to be transmitted, browsing of transmitted or received mails, and a process related to a communication protocol of an E-mail.

When the second process (postponement of E-mail communication) or the third process (storage of an E-mail) is performed in the communication regulation processing block 6 at the time when an E-mail is produced, the E-mail processing block 7 displays a predetermined data production screen which is used for producing an E-mail, in the user interface section 1.

[SMS Mail Processing Block 8]

The SMS mail processing block 8 performs various processes related to SMS mail communication, such as production of an SMS mail which is to be transmitted, browsing of transmitted or received mails, and a process related to a communication protocol of an SMS mail.

When communication regulation occurs at the time when an E-mail is transmitted, and the communication regulation processing block 6 selects an SMS mail as the alternative communicating section, the SMS mail processing block 8 retrieves an address (for example, a telephone number) of an SMS mail correlated with the destination address of the E-mail which is intended to be transmitted, from the address book in the storage section 2. When the retrieval address is found, an SMS mail in which the contents of the original E-mail are copied is transmitted to the retrieved address. When the retrieval address is not found, a predetermined address entry screen for inputting the address of the SMS mail is displayed in the user interface section 1.

In this case, when there is an attached file in the original E-mail, however, it is impossible to transmit the file together with the SMS mail. The SMS mail processing block 8 displays a message that the attached file cannot be transmitted, in the user interface section 1.

When the size of the original E-mail exceeds the data size specified in an SMS mail, it is impossible to transmit the SMS mail. Therefore, the SMS mail processing block 8 displays a predetermined mail correction screen for correcting the contents of the mail to be transmitted, in the user interface section 1. For example, the contents of the original E-mail are pasted to a screen for producing an SMS mail to request the user to correct the mail.

[Voice Communication Processing Block 9]

The voice communication processing block 9 performs various processes related to voice communication, such as display of a called number, input of a calling number, a process related to a communication protocol of voice communication.

When communication regulation occurs at the time when an E-mail is produced, and the communication regulation processing block 6 selects voice communication as the alternative communicating section, the voice communication processing block 9 displays telephone numbers registered in the address book stored in the storage section 2 in the user interface section 1 to request the user to input the telephone number.

By contrast, when communication regulation occurs at the time when an E-mail is transmitted, and the communication regulation processing block 6 selects voice communication as the alternative communicating section, the voice communication processing block 9 retrieves a telephone number correlated with the destination address of the E-mail which is intended to be transmitted, from the address book in the storage section 2. When the retrieval telephone number is found, a call to the telephone number is made. When the retrieval telephone number is not found, telephone numbers registered in the address book stored in the storage section 2 are displayed in the user interface section 1 to request the user to input the telephone number.

The operation of the thus configured portable terminal will be described with reference to the flowcharts of FIGS. 2 to 8.

The following description is made assuming that, for example, the portable terminal shown FIG. 1 performs communication in accordance with "cdma2000".

When an operation of giving instructions for initiating E-mail production (for example, depression of the E-mail production button) is conducted on the user interface section 1 (step ST10), the communication regulation processing block 6 checks whether or not the communication regulation determining block 5 determines that E-mail communication is regulated (step ST15). If E-mail communication is not regulated, the process advances to step ST135 which will be described later.

If E-mail communication is regulated, the communication regulation determining block 5 searches neighboring base stations which can perform communication (for example, a base station in which the received signal strength is 4 dB or higher), and the communication is handed off to one of such stations (step ST20). Then, the block waits for reception of the APM from the base station (step ST25). When the APM is received, the communication regulation determining block 5 determines whether E-mail communication is regulated or not, on the basis of regulation information contained in the APM (step ST30). If a base station in which E-mail communication is not regulated is found as a result of the determination, the process transfers to step ST135 which will be described later.

If it is determined in step ST30 that E-mail communication is regulated, the communication regulation determining block 5 repeats the processes of steps ST20 to ST30. When E-mail communication is regulated in all of neighboring base stations which can perform communication, the communication regulation determining block 5 finally determines that E-mail communication is regulated. When the base station is kept connected, the call probability is lowered. Therefore, the communication is again handed off to the base station at the timing of step ST10 (step ST35).

If the communication regulation determining block 5 finally determines that E-mail communication is regulated, the communication regulation processing block 6 displays a message "Now, data communication is regulated. Select one of following commands." on the screen of the user interface section 1 (step ST40).

When all of the communicating section (E-mail, SMS mail, and voice communication) are regulated in the current base station, the communication regulation processing block 6 displays three commands "(1) Transmit later, (2) Store without transmission, (3) Stop production of mail" on the screen of the user interface section 1 (step ST50).

When E-mail communication and voice communication are regulated in the current base station, the communication regulation processing block 6 displays four commands "(1) Transmit SMS mail, (2) Transmit later, (3) Store without transmission, (4) Stop production of mail" on the screen of the user interface section 1 (step ST60).

When only E-mail communication is regulated in the current base station, the communication regulation processing block 6 displays five commands "(1) Make call, (2) Transmit SMS mail, (3) Transmit later, (4) Store without transmission, (5) Stop production of mail" on the screen of the user interface section 1 (step ST65).

Figure 9:
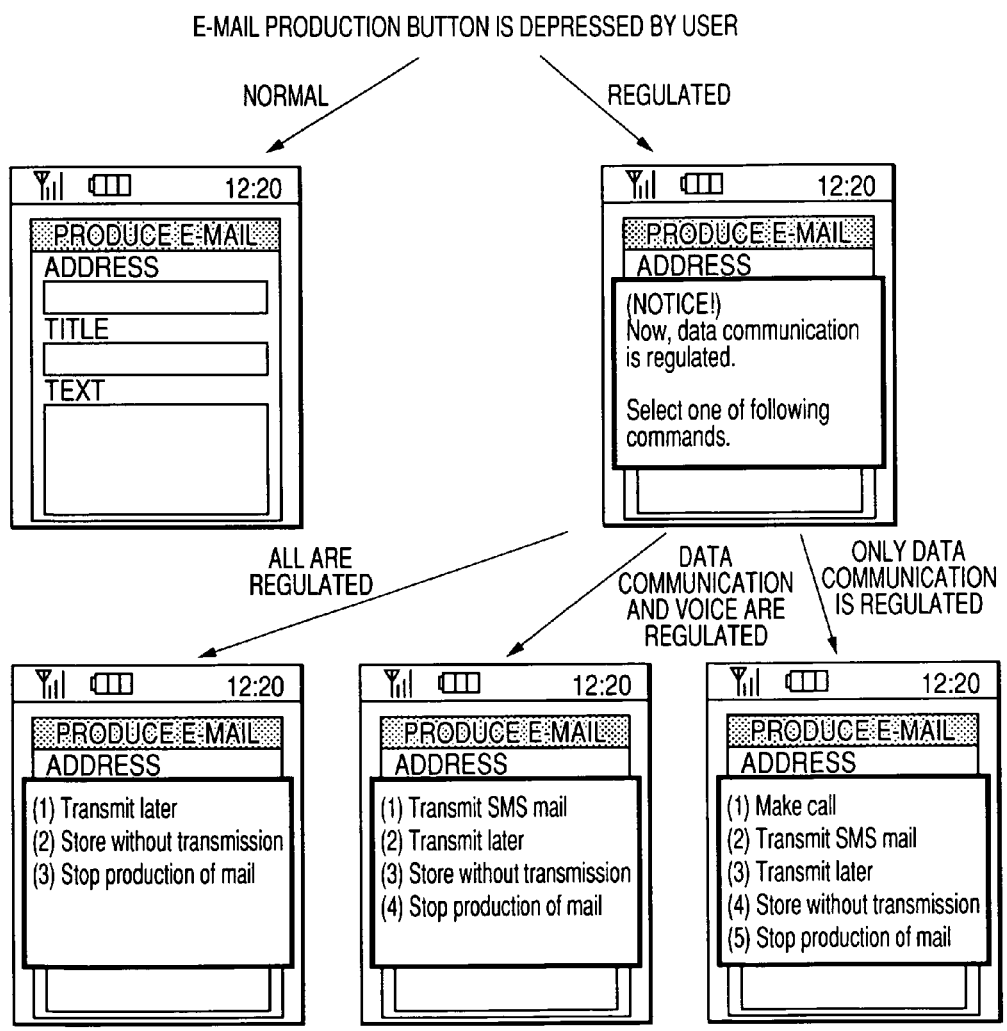
FIG. 9 is a view showing an example of a screen display of a user interface section when an E-mail is produced.

FIG. 9 shows an example of the screen display of the user interface section 1 when an E-mail is produced. As shown in FIG. 9, in the case where communication regulation occurs when production of an E-mail is initiated, a screen which requests selection of the above-mentioned three to five commands according to the kinds of the regulated communication paths is displayed on the screen of the user interface section 1.

When an operation of selecting "Transmit later" (second process) or "Store without transmission" (third process) is performed on the user interface section 1 in the screen of step ST50, ST60, or ST65, the E-mail processing block 7 displays a predetermined E-mail production screen in the user interface section 1 (step ST75), thereby requesting the user to produce an E-mail. When production of an E-mail by the user is ended and an operation of giving instructions for ending E-mail production (for example, depression of an end button) is conducted on the user interface section 1, the process transfers to step ST335 which will be described later in the case where "Transmit later" is selected (step ST85), or a process of storing the produced E-mail into the storage section 2 is performed in the case where "Store without transmission" is selected (step ST90).

Figure 10:
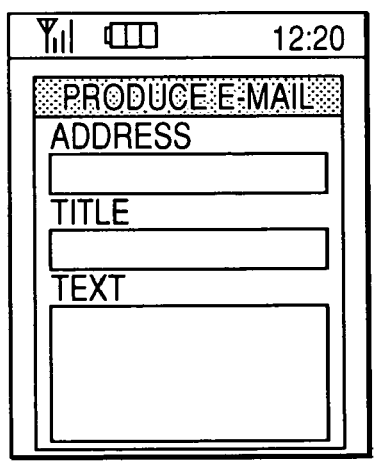
FIG. 10 is a view showing an example of the screen display of the user interface section when "Transmit later" or "Store without transmission" is selected in a command selection screen shown in FIG. 9.

FIG. 10 shows an example of the screen display of the user interface section 1 when "Transmit later" or "Store without transmission" is selected in the screen of step ST50, ST60, or ST65. In this case, the E-mail production screen is displayed in the user interface section 1.

When an operation of selecting "Transmit SMS mail" (first process) is performed on the user interface section 1 in the screen of step ST50, ST60, or ST65 (step ST95), the SMS mail processing block 8 displays a predetermined SMS mail production screen in the user interface section 1 (step ST100), thereby requesting the user to produce an SMS mail. When production of an SMS mail by the user is ended and an operation of giving instructions for ending SMS mail production (for example, depression of the end button) is conducted on the user interface section 1, the SMS mail processing block 8 transmits the produced SMS mail (step ST110).

Figure 11:
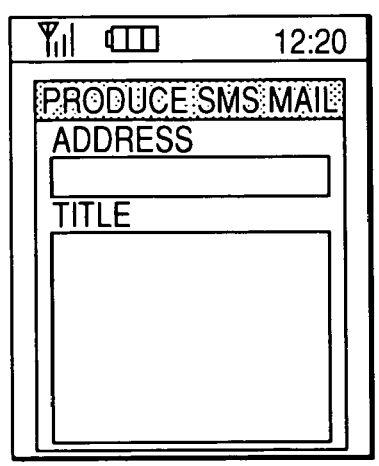
FIG. 11 is a view showing an example of the screen display of the user interface section when "Transmit SMS mail" is selected in the command selection screen shown in FIG. 9.

FIG. 11 shows an example of the screen display of the user interface section 1 when "Transmit SMS mail" is selected in the screen of step ST50, ST60, or ST65. In this case, the SMS mail production screen is displayed in the user interface section 1.

When an operation of selecting "Make call" (first process) is performed on the user interface section 1 in the screen of step ST50, ST60, or ST65 (step ST115), the voice communication processing block 9 displays telephone numbers registered in the address book stored in the storage section 2, on the screen of the user interface section 1 (step ST120), thereby requesting the user to input the telephone number. When an operation of inputting a telephone number into the user interface section 1 is performed in response to the screen display, the voice communication processing block 9 calls the input telephone number (step ST125).

Figure 12:
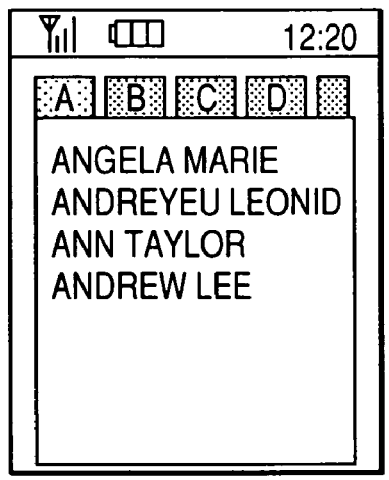
FIG. 12 is a view showing an example of the screen display of the user interface section when "Make call" is selected in the command selection screen shown in FIG. 9.

FIG. 12 shows an example of the screen display of the user interface section 1 when "Make call" is selected in the screen of step ST50, ST60, or ST65. In this case, a screen showing the address book is displayed in the user interface section 1.

When an operation of selecting "Stop production of mail" (fourth process) or that of interrupting the process (for example, depression of a cancel key) is performed on the user interface section 1 in the screen of step ST50, ST60, or ST65 (step ST130), the E-mail processing block 7 aborts the production of an E-mail.

Figure 13:
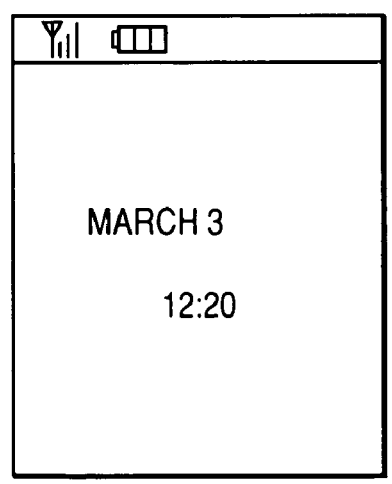
FIG. 13 is a view showing an example of the screen display of the user interface section when "Stop production of mail" is selected in the command selection screen shown in FIG. 9.

FIG. 13 shows an example of the screen display of the user interface section 1 when "Stop production of mail" is selected in the screen of step ST50, ST60, or ST65. In this case, the screen of the user interface section 1 is returned to a predetermined idle screen.

When E-mail communication is not regulated in step ST15 or ST30, the E-mail processing block 7 displays the predetermined E-mail production screen in the user interface section 1 (step ST135). When production of an E-mail by the user is ended and an operation of giving instructions for transmitting the E-mail (for example, depression of a transmission button) is conducted of the user interface section 1 (step ST140), the communication regulation processing block 6 checks whether or not the communication regulation determining block 5 determines that E-mail communication is regulated. If E-mail communication is not regulated, the E-mail processing block 7 transmits the E-mail (step ST175).

If E-mail communication is regulated, the communication regulation determining block 5 searches neighboring base stations which can perform communication (for example, a base station in which the received signal strength is 4 dB or higher), and the communication is handed off to one of such stations (step ST150). Then, the block waits for reception of the APM from the base station (step ST155). When the APM is received, the communication regulation determining block 5 determines whether E-mail communication is regulated or not, on the basis of regulation information contained in the APM (step ST160). If a base station in which E-mail communication is not regulated is found as a result of the determination, the E-mail processing block 7 transmits the E-mail (step ST165). When the base station is kept connected, the call probability is lowered. Therefore, the communication is again handed off to the base station at the timing of step ST140 (step ST170).

If it is determined in step ST160 that E-mail communication is regulated, the communication regulation determining block 5 repeats the processes of steps ST150 to ST160. When E-mail communication is regulated in all of neighboring base stations which can perform communication, the communication regulation determining block 5 finally determines that E-mail communication is regulated. When the base station is kept connected, the call probability is lowered. Therefore, the communication is again handed off to the base station at the timing of step ST140 (step ST180).

If the communication regulation determining block 5 finally determines that E-mail communication is regulated, the communication regulation processing block 6 displays a message "Now, data communication is regulated. Select one of following commands" on the screen of the user interface section 1 (step ST185).

When all of the communicating section (E-mail, SMS mail, and voice communication) are regulated in the current base station, the communication regulation processing block 6 displays three commands "(1) Transmit later, (2) Store without transmission, (3) Stop production of mail" on the screen of the user interface section 1 (step ST195).

When E-mail communication and voice communication are regulated in the current base station, the communication regulation processing block 6 displays four commands "(1) Transmit SMS mail, (2) Transmit later, (3) Store without transmission, (4) Stop production of mail" on the screen of the user interface section 1 (step ST205).

When only E-mail communication is regulated in the current base station, the communication regulation processing block 6 displays five commands "(1) Make call, (2) Transmit SMS mail, (3) Transmit later, (4) Store without transmission, (5) Stop production of mail" on the screen of the user interface section 1 (step ST210).

FIG. 14 shows an example of the screen display of the user interface section 1 when an E-mail is transmitted. As shown in FIG. 14, in the case where communication regulation occurs when an E-mail is transmitted, a screen which requests selection of the above-mentioned three to five commands according to the kind(s) of the regulated communication path(s) is displayed in the user interface section 1.

When an operation of selecting "Transmit later" is performed on the user interface section 1 in the screen of step ST195, ST205, or ST210 (step ST215), the process transfers to step ST335 which will be described later.

When an operation of selecting "Store without transmission" (third process) is performed on the user interface section 1 in the screen (step ST220), the E-mail processing block 7 stores the produced E-mail into the storage section 2 (step ST225).

When an operation of selecting "Stop production of mail" (fourth process) or that of interrupting the process (for example, depression of a cancel key) is performed on the user interface section 1 in the screen (step ST330), the E-mail processing block 7 aborts the production of an E-mail.

Figure 15:
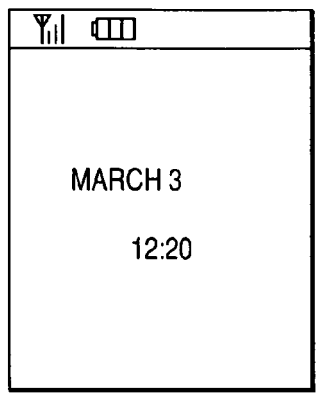
FIG. 15 is a view showing an example of the screen display of the user interface section when "Transmit later", "Store without transmission", "Stop production of mail" is selected in the command selection screen shown in FIG. 14.

FIG. 15 shows an example of the screen display of the user interface section 1 when "Transmit later", "Store without transmission", or "Stop production of mail" is selected in the screen of step ST195, ST205, or ST210. In this case, the screen of the user interface section 1 is returned to a predetermined idle screen.

When an operation of selecting "Transmit SMS mail" (first process) is performed on the user interface section 1 in the screen of step ST195, ST205, or ST210 (step ST230), the SMS mail processing block 8 determines whether there is an attached file in the E-mail produced in step ST135 or not (step ST235). If there is an attached file, the SMS mail processing block 8 displays a message "Attached file cannot be transmitted" on the screen of the user interface section 1, the process is returned to step ST215.

If there is not an attached file, the SMS mail processing block 8 determines whether an SMS mail address corresponding to the destination E-mail address is registered in the address book in the storage section 2 or not (step ST245). If there is no SMS mail address corresponding to the E-mail address, the SMS mail processing block 8 displays a predetermined address entry screen in the user interface section 1, thereby requesting the user to input the SMS mail address (step ST250). When an input of an SMS mail address by the user is ended and an operation of ending the address entry is conducted on the user interface section 1 (step ST255), the process transfers to step ST265 which will be described later.

By contrast, if there is an SMS mail address corresponding to the E-mail address, the SMS mail processing block 8 converts the E-mail address to the SMS mail address (step ST260). Then, the process transfers step ST265 which is described below.

In step ST265, the SMS mail processing block 8 determines whether or not the E-mail produced in step ST135 contains characters the number of which is within the limit of the transmittable number of characters. If the characters of the produced E-mail do not exceed the limit of the transmittable number of characters, the SMS mail processing block 8 transmits an SMS mail in which the contents of the produced E-mail are copied, to the SMS mail address which is set in step ST250 or ST260 (step ST285).

By contrast, if the characters of the produced E-mail exceeds the limit of the transmittable number of characters, the SMS mail processing block 8 displays a message "Exceeds limit of number of characters" on the screen of the user interface section 1 (step ST270).

Then, a predetermined SMS mail production screen in which the contents of the produced E-mail are copied is displayed in the user interface section 1 to request the user to correct the mail (step ST275). When, after the user corrects the contents of the mail, an operation of ending production of the SMS mail is conducted on the user interface section 1 (step ST280), the SMS mail processing block 8 transmits the corrected SMS mail to the SMS mail address which is set in step ST250 or ST260 (step ST285).

Figure 16:
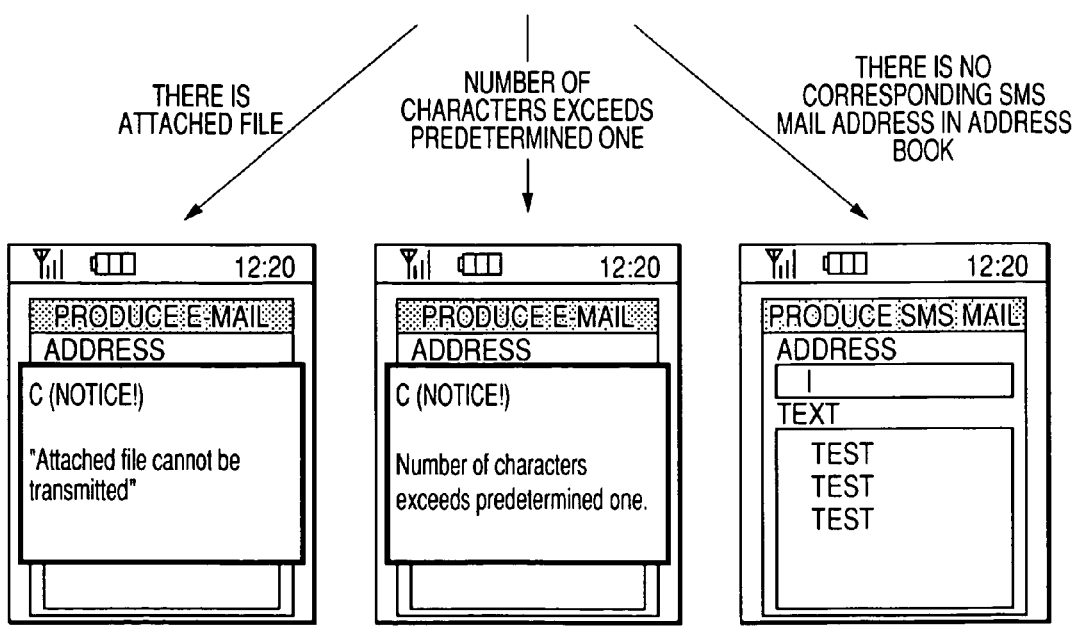
FIG. 16 is a view showing an example of the screen display of the user interface section when "Transmit SMS mail" is selected in the command selection screen shown in FIG. 14.

FIG. 16 shows an example of the screen display of the user interface section 1 when "Transmit SMS mail" is selected in the screen of step ST195, ST205, or ST210. FIG. 16 illustrates screen displays respectively in the cases where there is an attached file in the original E-mail, the number of characters of the original E-mail exceeds the specified number in an SMS mail, and an SMS mail address corresponding to the destination of the original E-mail is not registered in the address book.

When an operation of selecting "Make call" (first process) is performed on the user interface section 1 in the screen of step ST195, ST205, or ST210 (step ST290), the voice communication processing block 9 displays a message "Mail is stored?" on the screen of the user interface section 1 (step ST295).

When an operation of selecting "Store" is conducted on the user interface section 1 in response to the screen display, the voice communication processing block 9 stores the produces E-mail into the storage section 2 (step ST305). After the storage of the E-mail, the process transfers to step ST310.

By contrast, when an operation of selecting "Not stored" is conducted on the user interface section 1, the voice communication processing block 9 causes the process to transfer to step ST310 without storing the E-mail.

In step ST310, the voice communication processing block 9 determines whether a telephone number corresponding to the destination E-mail address is registered in the address book in the storage section 2 or not. If there is a telephone number corresponding to the E-mail address, the voice communication processing block 9 sets the corresponding telephone number as the partner's telephone number, and display the telephone number on the screen of the user interface section 1 (step ST315). If there is not a telephone number corresponding to the E-mail address, the voice communication processing block 9 displays a predetermined telephone number entry screen in the user interface section 1, thereby requesting the user to input the telephone number (step ST320).

When, after the process of step ST315 or ST320, an operation of initiating a call (for example, depression of a call button) is conducting on the user interface section 1, the voice communication processing block 9 makes a call to the telephone number which is input in step ST315 or ST320 (step ST325).

Figure 17:
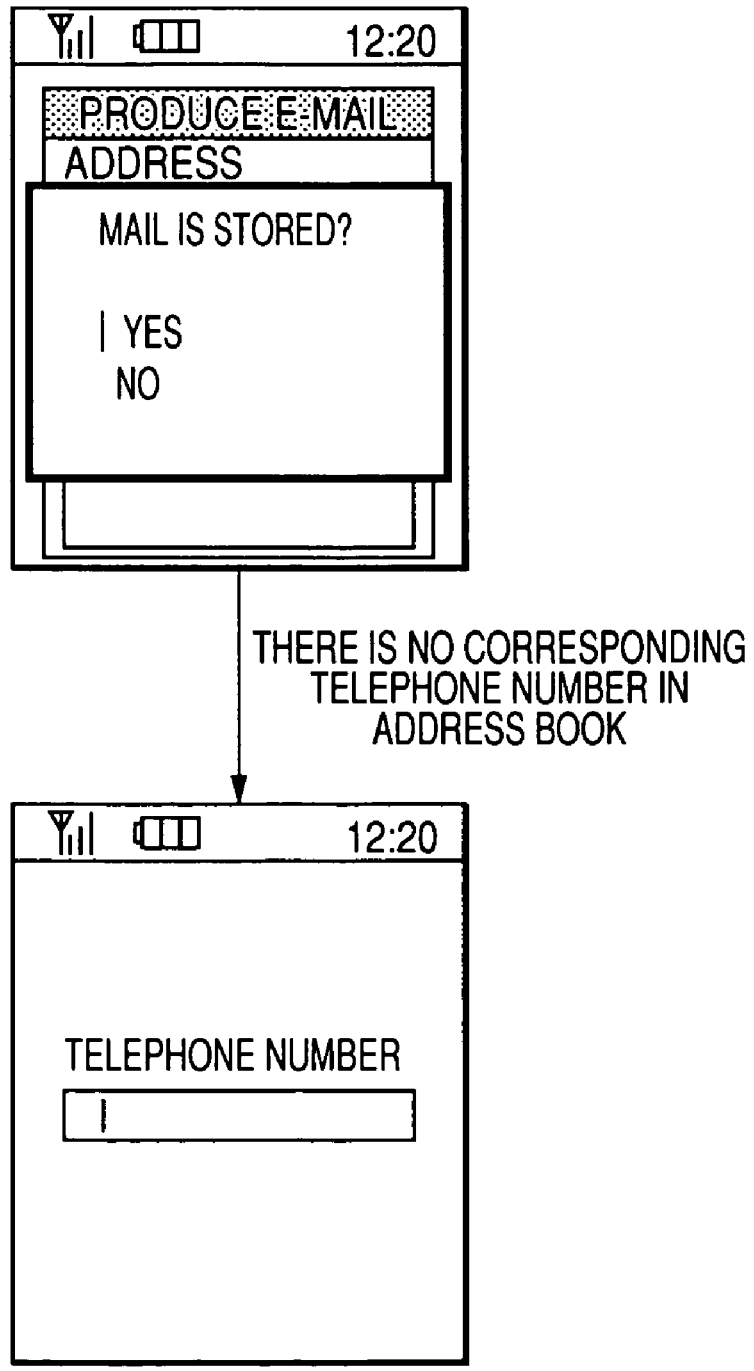
FIG. 17 is a view showing an example of the screen display of the user interface section when "Make call" is selected in the command selection screen shown in FIG. 14.

FIG. 17 shows an example of the screen display of the user interface section 1 when "Make call" is selected in the screen of step ST195, ST205, or ST210. FIG. 17 illustrates a screen which inquires whether the mail address is to be stored or not, and a telephone number entry screen in the case where a telephone number corresponding to the E-mail address is not in the address book.

When "Transmit later" (second process) is selected in step ST70 or ST215, the communication regulation determining block 5 determines whether the portable terminal performs intermittent reception or not (step ST335). If intermittent reception is performed, it is further determined whether or not the mode is a reception mode which is specified in "cdma2000", and which is called quick paging (step ST340).

Hereinafter, intermittent reception and quick paging in "cdma2000" will be described with reference to FIG. 18.

A portable terminal which performs intermittent reception monitors for 80 msec. a slot which is allocated to the terminal, at intervals of 5.12 sec. in a communication channel that is called paging channel. The portable terminal receives a message from a base station which is included in the slot, and which is called general paging. When the general paging message contains information indicating that it is not necessary to monitor the next slot, the portable terminal stops the reception operation for about 5 sec. until the next monitoring timing.

By contrast, a portable terminal which performs quick paging monitors two slots (S1 and S3, or S2 and S4) respectively for 20 msec. which are allocated to the terminal, at intervals of 5.12 sec. in a communication channel that is called quick paging channel. Only when both the two slots contain bit data of a predetermined value, the portable terminal monitors the slot of the above-mentioned paging channel which is allocated to the slots of the quick paging channel after an elapse of 20 msec. or 40 msec. Therefore, a portable terminal which performs quick paging is not requested to monitor the 80 msec. slot of the paging channel unless both the two slots contain bit data of a predetermined value. Consequently, the reception time can be shortened as compared with a portable terminal which performs usual intermittent reception.

As described above, a portable terminal which performs intermittent reception or quick paging does not monitor most of the time, and hence hardly receives the latest APM transmitted from a base station. Namely, as shown in FIG. 19, a portable terminal which performs intermittent reception cannot recognize cancellation of communication regulation in a base station until the APM is received at the timing of monitoring the paging channel which arises at intervals of about 5 secs. A portable terminal which performs quick paging more hardly receives the APM as compared with usual intermittent reception, and hence there is very little opportunity to recognize cancellation of communication regulation. When a portable terminal performs such intermittent reception, consequently, there is the possibility that the time when cancellation of communication regulation is recognized and transmission of an E-mail is initiated largely lags behind the time when the regulation is actually canceled.

In the portable terminal of the embodiment, when "Transmit later" (second process) is selected in step ST70 or st215, therefore, a period when the APM is continuously monitored even during intermittent reception is disposed.

FIG. 20 shows an example of related-art intermittent reception, and FIG. 21 shows an operation example of intermittent reception in the portable terminal of the embodiment.

In the related-art intermittent reception, as shown in FIG. 20, only monitoring of an 80 msec. slot of the paging channel is performed at intervals of 5.12 sec., and the reception operation is stopped for remaining about 5 sec. Even when the APM is transmitted from a base station during the reception stop period, therefore, a portable terminal cannot receive the APM.

By contrast, in the portable terminal of the embodiment, even during when intermittent reception or quick paging is performed, as shown in FIG. 21, the paging channel is continuously monitored for each period of 5.12 sec. intermittent reception until the APM is received. In the case where the APM is received after an elapse of 2 sec. from the timing of initiating intermittent reception, for example, the paging channel is kept monitored for about 2 sec. even after the 80 msec. monitoring period is ended, and, after the APM is received, the reception operation is stopped for about 3 sec.

Referring back to FIG. 8, if it is determined in step ST340 that the portable terminal performs quick paging, the communication regulation determining block 5 returns the reception mode from the quick paging to usual intermittent reception (step ST345). Then, it is determined whether the APM is received at the timing of monitoring the paging channel in intermittent reception or not (step ST350). If the APM is not received, the monitoring of the paging channel is continued until the APM is received (step ST355).

If it is determined in step ST340 that the portable terminal performs intermittent reception, the communication regulation determining block 5 determines whether the APM is received at the timing of monitoring the paging channel or not (step ST350). If the APM is not received, the monitoring of the paging channel is continued until the APM is received (step ST355).

If it is determined in step ST335 that the portable terminal does not perform intermittent reception, the paging channel is monitored at any time to receive the APM (step ST355).

When the APM is received in step ST355, the communication regulation determining block 5 determines whether communication regulation of the base station is cancelled or not, on the basis of regulation information contained in the APM (step ST360). If the communication regulation determining block 5 determines that the regulation is canceled, the E-mail processing block 7 transmits the E-mail produced in step ST75 or ST135 (step ST365) A notification of completion of the transmittance of the E-mail is displayed in the user interface section 1 (step ST370).

By contrast, if it is determined that the regulation is not canceled, the system controlling section 4 determines whether or not it is necessary to hand off the current base station because of movement of the terminal or the like (step ST375). If necessary, the hand-off is performed (step ST380). The process is returned to step ST335 to repeat monitoring of the APM and determination of cancellation of the regulation (steps ST335 to ST360).

As described above, in the portable terminal of the embodiment, if, at the time when the E-mail processing block 7 prepares for communication or initiates communication, the communication regulation determining block 5 determines that E-mail communication is regulated, information indicative of alternative communicating section using another communication path in which communication is not regulated is displayed in the user interface section 1.

According to the configuration, when communication regulation occurs, it is possible to easily check which communicating section is effective. Therefore, the user can easily make a determination such as that alternative communicating section is used, or that communication is aborted. Consequently, the operability can be greatly improved as compared with a related-art portable terminal in which it must be manually checked whether alternative communicating section is effective or not.

In the portable terminal of the embodiment, alternative communicating section can be easily selected by inputting instructions to the user interface section 1 while checking display of information relating to alternative communicating section. When communication regulation occurs, therefore, it is possible to easily perform a change to alternative communicating section.

In the portable terminal of the embodiment, when E-mail communication is regulated, one of: the first process of selecting new communicating section to be used in communication; the second process of postponing E-mail communication until E-mail communication regulation is cancelled; the third process of storing a produced E-mail without transmitting the E-mail; and the fourth process of stopping E-mail communication is selected in accordance with instructions input to the user interface section 1, and the selected process is performed. In addition to selection of alternative communicating section, therefore, operations such postponement of E-mail communication, storage of the E-mail, and stop of E-mail communication can be easily selected, and the operability can be further improved.

In the portable terminal of the embodiment, when communication regulation occurs during transmission of an E-mail and the communication regulation processing block 6 selects voice communication as alternative communicating section, a telephone number correlated with the destination address of the E-mail which is intended to be transmitted is retrieved from the address book in the storage section 2. When the retrieval telephone number is found, a call to the telephone number is made. When the retrieval telephone number is not found, telephone numbers registered in the address book stored in the storage section 2 are displayed in the user interface section 1 to request the user to input the telephone number.

According to the configuration, the telephone number corresponding to the E-mail address can be automatically retrieved from the address book, and voice communication can be transmitted. Therefore, the operation can be simplified as compared with the case where the telephone number is manually searched from the address book.

In the portable terminal of the embodiment, when communication regulation occurs during transmission of an E-mail and the communication regulation processing block 6 selects an SMS mail as alternative communicating section, an SMS mail address correlated with the destination address of the E-mail which is intended to be transmitted is retrieved from the address book in the storage section 2. When the retrieval address is found, an SMS mail in which the contents of the original E-mail are copied is transmitted to the retrieved address. When the retrieval address is not found, a predetermined address entry screen for inputting the address of the SMS mail is displayed in the user interface section 1.

According to the configuration, the SMS mail address corresponding to the E-mail address can be automatically retrieved from the address book, and the SMS mail can be transmitted. Therefore, the operation can be simplified as compared with the case where the SMS mail address is manually searched from the address book.

In the portable terminal of the embodiment, when the E-mail processing block 7 prepares for communication or initiates communication, it is determined whether E-mail communication is regulated in the accessed base station or not. If it is determined that E-mail communication is regulated, it is further determined whether E-mail communication is regulated in other accessible base stations or not. If an accessible base station in which communication is not regulated is found, E-mail communication is initiated through the station in which communication is not regulated. If no accessible base station in which communication is not regulated is found, it is finally determined that E-mail communication is regulated. According to the configuration, a failure of E-mail communication due to communication regulation can be effectively avoided.

In the portable terminal of the embodiment, in the case where the communication regulation processing block 6 performs the second process of performing E-mail communication after communication regulation is cancelled, when the portable terminal is in the operation mode where reception is intermittently done at constant intervals, the process of continuously monitoring a predetermined communication channel through which the message (APM) informing whether E-mail communication is regulated or not is performed at the constant intervals until the message is received.

According to the configuration, even when intermittent reception is performed, cancellation of regulation of E-mail communication can be rapidly known, and E-mail communication can be performed. Therefore, a period in which E-mail communication cannot be performed although regulation is cancelled can be shortened.

In the above, the one embodiment of the invention has been described in detail. The invention is not restricted to the embodiment, and various modifications fall within the scope of the invention.

In the embodiment, the process in which E-mail communication is regulated has been exemplarily described. The invention is not restricted to this. The invention can be applied also to processes in which various other kinds of data communication are regulated. The invention is not restricted to data communication, and can be applied also to processes in which various other kinds of communication are regulated.

In the invention, the kind and number of communicating section mounted on the portable terminal are not particularly restricted, and can be arbitrarily set.

In the embodiment, the example in which, when communication regulation occurs, one of the first to fourth processes is selected and performed has been described. The invention is not restricted to the example. For example, only the first process may be performed, or one of combinations of the first process and another arbitrary process may be selected and performed.

In the embodiment, when there is an attached file in an E-mail, a message stating that the attached file cannot be transmitted by the SMS mail is displayed in the user interface section 1. The invention is not restricted to this. In the case where communication regulation occurs during transmission of an E-mail and the communication regulation processing block 6 selects the SMS mail processing block 8 as alternative communicating section, when there is an attached file in the original E-mail, the E-mail processing block 7 may transmit the attached file after the communication regulation determining block 5 determines that communication regulation is canceled in the communication path for E-mail communication. In this case, the attached file may be transmitted together with the text of the original E-mail, or only the attached file may be transmitted.

All of the processes of the controlling section 4 may be performed by hardware, or at least part of them may be performed on the basis of programs.

The portable terminal of the invention is not restricted to a portable telephone, and can be applied a wide variety of portable terminal devices having a communication function, such as a PDA (personal digital assistants).

What is claimed is:

1. A portable terminal having a plurality of communicating sections, the portable terminal comprising:
   a communication regulation determining section which determines whether all of the communicating sections are regulated or not, respectively; and
   a communication regulation processing section which displays information of all unregulated communicating sections on a user interface section, when a regulated communicating section prepares for communication or initiates communication.

2. A portable terminal having a plurality of communicating sections, the portable terminal comprising:
   a communication regulation determining section which determines whether all of the communicating sections are regulated or not, respectively; and
   a communication regulation processing section which displays information of all unregulated communicating sections on a user interface section, enables to change a regulated communicating section to the unregulated communicating section, when the regulated communicating section for performing a first data communication prepares for communication or initiates communication.

3. The portable terminal according to claim 2, wherein the plurality of communicating sections include two or more of a first data communicating section which performs the first data communication, a second data communicating section which performs second data communication with using a communication path which is different from the communication path for the first data communication, and a voice communicating section which performs voice communication.

4. The portable terminal according to claim 2 or 3, wherein the communication regulation processing section enables to select one of a first process of selecting communicating section which uses a communication path different from the communication path for the first data communication, a second process in which initiation of the first data communication is waited until the communication regulation determining section determines that communication is not regulated in the communication path for the first data communication, a third process in which transmission data of the first data communication is not transmitted but stored, and a fourth process in which the first data communication is aborted.

5. The portable terminal according to claim 4, wherein, if the communication regulation determining section determines that communication is regulated in the communication paths of all of the communicating section, the communication regulation processing section enables to select one of the second process, the third process, and the fourth process in accordance with instructions which are input to the user interface section.

6. The portable terminal according to claim 5, wherein, in a case where the communication regulation determining section determines that communication is regulated in the communication path for the first data communication when transmission data of the first data communication are produced and/or transmitted, the communication regulation processing section displays the information of another communicating section using another communication path on the user interface section.

7. The portable terminal according to claim 6, wherein the time when transmission data are produced is a time when instructions for initiating production of the transmission data are input to the user interface section, and the time when transmission data are transmitted is a time when instructions for initiating transmission of the transmission data are input to the user interface section.

8. The portable terminal according to claim 6, where in the plurality of communicating sections include the first data communicating section which performs the first data communication, and second data communicating section which performs second data communication with using a communication path which is different from the communication path for the first data communication, and in a case where the communication regulation processing section selects the second data communicating section as the changed communicating section when the transmission data of the first data communication are produced, a predetermined data production screen which produces the transmission data of the second data communication is displayed on the user interface section.

9. The portable terminal according to claim 6, wherein, in accordance with instructions input to the user interface section, the communication regulation processing section enables to select one of the first process of selecting communicating section which uses a communication path different from the communication path for the first data communication, the second process in which initiation of the first data communication is waited until the communication regulation determining section determines that communication is not regulated in the communication path for the first data communication, and the third process in which transmission data of the first data communication is not transmitted but stored, and in a case where the communication regulation processing section selects the second process or the third process when the transmission data of the first data communication are produced, the communicating section which performs the first data communication displays a predetermined data production screen for producing the transmission data of the first data communication on the user interface section.

10. The portable terminal according to claim 9, wherein, in the case where the communication regulation processing section implements the second process when the portable terminal is in an operation mode where reception is intermittently done at constant intervals, a communication channel through which a message informing whether the first data communication is regulated or not is transmitted is continuously monitored at the constant intervals until the message is received.

11. The portable terminal according to claim 6, wherein the plurality of communicating sections include voice communicating section which performs voice communication, the portable terminal further has a storage section which stores a destination address of the first data communication and a telephone number of the voice communication while being correlated with each other, and in a case where the communication regulation processing section selects the voice communicating section as the changed communicating section when the transmission data of the first data communication are transmitted, the telephone number correlated with the destination address of the transmission data is retrieved from the storage section, and a call is made to the retrieved telephone number.

12. The portable terminal according to claim 6, wherein the plurality of communicating sections include a first data communicating section which performs the first data communication, and a second data communicating section which performs second data communication with using a communication path which is different from the communication path for the first data communication, the portable terminal further has a storage section which stores an address of the first data communication and an address of the second data communication while being correlated with each other, and in a case where the communication regulation processing section selects the second data communicating section as the changed communicating section when the transmission data of the first data communication are transmitted, the address of the second data communication correlated with the destination address of the transmission data is retrieved from the storage section, and the transmission data are transmitted to the retrieved address.

13. The portable terminal according to claim 12,
wherein in a case where the communication regulation processing section selects the second data communicating section as the changed communicating section when the transmission data of the first data communication are transmitted, if a message that the attached file cannot be transmitted is displayed on the user interface section.

14. The portable terminal according to claim 12,
wherein in a case where the communication regulation processing section selects the second data communicating section as the changed communicating section when the transmission data of the first data communication are transmitted, if a size of the transmission data exceeds a predetermined data size, a predetermined data correction screen for correcting the transmission data is displayed on the user interface section.

15. The portable terminal according to claim 12,
wherein in a case where the communication regulation processing section selects the second data communicating section as the changed communicating section when the transmission data of the first data communication are transmitted, if there is an attached file in the transmission data, the attached file is transmitted by the first data communicating section after the communication regulation determining section determines that communication is not regulated in the communication path for the first data communication.

16. The portable terminal according to claim 15,
wherein, the communication regulation determining section determines whether the first data communication is regulated in an accessed base station or not when the communicating section which performs the first data communication prepares for communication or initiates communication; if it is determined that the first data communication is regulated in the base station, further determines whether the first data communication is regulated in other accessible base stations or not; if an accessible base station in which communication is not regulated is found, initiates the first data communication in the station in which communication is not regulated; and, if no accessible base station in which communication is not regulated is found, finally determines that the first data communication is regulated.

17. A portable terminal having a plurality of communicating sections, the portable terminal comprising:
a communication regulation determining section which determines whether one of the plurality of communicating sections is regulated or not; and
a communication regulation processing section which displays information of an unregulated communicating section on a user interface section, enables to change a regulated communicating section to the unregulated communicating section, when the regulated communicating section for performing a first data communication prepares for communication or initiates communication,
wherein the communication regulation processing section enables to select one of a first process of selecting communicating section which uses a communication path different from the communication path for the first data communication, a second process in which initiation of the first data communication is waited until the communication regulation determining section determines that communication is not regulated in the communication path for the first data communication, a third process in which transmission data of the first data communication is not transmitted but stored, and a fourth process in which the first data communication is aborted,
wherein, if the communication regulation determining section determines that communication is regulated in the communication paths of all of the communicating section, the communication regulation processing section enables to select one of the second process, the third process, and the fourth process in accordance with instructions which are input to the user interface section,
wherein, in a case where the communication regulation determining section determines that communication is regulated in the communication path for the first data communication when transmission data of the first data communication are produced and/or transmitted, the communication regulation processing section displays the information of another communicating section using another communication path on the user interface section,
wherein the plurality of communicating sections include voice communicating section which performs voice communication,
the portable terminal further has a storage section which stores a destination address of the first data communication and a telephone number of the voice communication while being correlated with each other, and
in a case where the communication regulation processing section selects the voice communicating section as the changed communicating section when the transmission data of the first data communication are transmitted, the telephone number correlated with the destination address of the transmission data is retrieved from the storage section, and a call is made to the retrieved telephone number.

18. A portable terminal having a plurality of communicating sections, the portable terminal comprising:
a communication regulation determining section which determines whether one of the plurality of communicating sections is regulated or not; and
a communication regulation processing section which displays information of an unregulated communicating section on a user interface section, enables to change a regulated communicating section to the unregulated communicating section, when the regulated communicating section for performing a first data communication prepares for communication or initiates communication,
wherein the communication regulation processing section enables to select one of a first process of selecting communicating section which uses a communication path different from the communication path for the first data communication, a second process in which initiation of the first data communication is waited until the communication regulation determining section determines that communication is not regulated in the communication path for the first data communication, a third process in which transmission data of the first data communication is not transmitted but stored, and a fourth process in which the first data communication is aborted,
wherein, if the communication regulation determining section determines that communication is regulated in the communication paths of all of the communicating section, the communication regulation processing section enables to select one of the second process, the third process, and the fourth process in accordance with instructions which are input to the user interface section,
wherein, in a case where the communication regulation determining section determines that communication is regulated in the communication path for the first data communication when transmission data of the first data communication are produced and/or transmitted, the communication regulation processing section displays the information of another communicating section using another communication path on the user interface section, wherein the plurality of communicating sections include a first data communicating section which performs the first data communication, and a second data communicating section which performs second data communication with using a communication path which is different from the communication path for the first data communication, the portable terminal further has a storage section which stores an address of the first data communication and an address of the second data communication while being correlated with each other, and in a case where the communication regulation processing section selects the second data communicating section as the changed communicating section when the transmission data of the first data communication are transmitted, the address of the second data communication correlated with the destination address of the transmission data is retrieved from the storage section, and the transmission data are transmitted to the retrieved address.

19. The portable terminal according to claim 18, wherein in a case where the communication regulation processing section selects the second data communicating section as the changed communicating section when the transmission data of the first data communication are transmitted, if a message that the attached file cannot be transmitted is displayed on the user interface section.

20. The portable terminal according to claim 18, wherein in a case where the communication regulation processing section selects the second data communicating section as the changed communicating section when the transmission data of the first data communication are transmitted, if a size of the transmission data exceeds a predetermined data size, a predetermined data correction screen for correcting the transmission data is displayed on the user interface section.

21. The portable terminal according to claim 18, wherein in a case where the communication regulation processing section selects the second data communicating section as the changed communicating section when the transmission data of the first data communication are transmitted, if there is an attached file in the transmission data, the attached file is transmitted by the first data communicating section after the communication regulation determining section determines that communication is not regulated in the communication path for the first data communication.

22. The portable terminal according to claim 21, wherein, the communication regulation determining section determines whether the first data communication is regulated in an accessed base station or not when the communicating section which performs the first data communication prepares for communication or initiates communication; if it is determined that the first data communication is regulated in the base station, further determines whether the first data communication is regulated in other accessible base stations or not; if an accessible base station in which communication is not regulated is found, initiates the first data communication in the station in which communication is not regulated; and, if no accessible base station in which communication is not regulated is found, finally determines that the first data communication is regulated.

23. A portable terminal having a plurality of communicating sections, the portable terminal comprising:

a communication regulation determining section which determines whether one of the plurality of communicating sections is regulated or not; and a communication regulation processing section which displays information of an unregulated communicating section on a user interface section, enables to change a regulated communicating section to the unregulated communicating section, when the regulated communicating section for performing a first data communication prepares for communication or initiates communication, wherein the communication regulation processing section enables to select one of a first process of selecting communicating section which uses a communication path different from the communication path for the first data communication, a second process in which initiation of the first data communication is waited until the communication regulation determining section determines that communication is not regulated in the communication path for the first data communication, a third process in which transmission data of the first data communication is not transmitted but stored, and a fourth process in which the first data communication is aborted, wherein, if the communication regulation determining section determines that communication is regulated in the communication paths of all of the communicating section, the communication regulation processing section enables to select one of the second process, the third process, and the fourth process in accordance with instructions which are input to the user interface section, wherein, in a case where the communication regulation determining section determines that communication is regulated in the communication path for the first data communication when transmission data of the first data communication are produced and/or transmitted, the communication regulation processing section displays the information of another communicating section using another communication path on the user interface section, wherein, in accordance with instructions input to the user interface section, the communication regulation processing section enables to select one of the first process of selecting communicating section which uses a communication path different from the communication path for the first data communication, the second process in which initiation of the first data communication is waited until the communication regulation determining section determines that communication is not regulated in the communication path for the first data communication, and the third process in which transmission data of the first data communication is not transmitted but stored, and in a case where the communication regulation processing section selects the second process or the third process when the transmission data of the first data communication are produced, the communicating section which performs the first data communication displays a predetermined data production screen for producing the transmission data of the first data communication on the user interface section, wherein, in the case where the communication regulation processing section implements the second process when the portable terminal is in an operation mode where reception is intermittently done at constant intervals, a communication channel through which a message informing whether the first data communication is regulated or not is transmitted is continuously monitored at the constant intervals until the message is received.

* * * * *